(12) United States Patent
Wu

(10) Patent No.: US 12,001,478 B2
(45) Date of Patent: Jun. 4, 2024

(54) VIDEO-BASED INTERACTION IMPLEMENTATION METHOD AND APPARATUS, DEVICE AND MEDIUM

(71) Applicant: BEIJING BYTEDANCE NETWORK TECHNOLOGY CO., LTD., Beijing (CN)

(72) Inventor: Ningtong Wu, Beijing (CN)

(73) Assignee: BEIJING BYTEDANCE NETWORK TECHNOLOGY CO., LTD. (CN)

( * ) Notice: Subject to any disclaimer, the term of this patent is extended or adjusted under 35 U.S.C. 154(b) by 0 days.

(21) Appl. No.: 17/848,553

(22) Filed: Jun. 24, 2022

(65) Prior Publication Data

US 2022/0318306 A1    Oct. 6, 2022

Related U.S. Application Data

(63) Continuation of application No. PCT/CN2020/125795, filed on Nov. 2, 2020.

(30) Foreign Application Priority Data

Dec. 25, 2019 (CN) .......................... 201911360690.0

(51) Int. Cl.
*G06F 16/74* (2019.01)
*G06F 3/0482* (2013.01)
*G06F 16/75* (2019.01)
*G06F 16/78* (2019.01)

(52) U.S. Cl.
CPC .......... *G06F 16/743* (2019.01); *G06F 3/0482* (2013.01); *G06F 16/75* (2019.01); *G06F 16/7867* (2019.01)

(58) Field of Classification Search
CPC ...... G06F 3/0482; G06F 16/743; G06F 16/75; G06F 16/7867
See application file for complete search history.

(56) References Cited

U.S. PATENT DOCUMENTS 8,055,803 B1 * 11/2011 Issa ........................ G06Q 10/10
709/253
2008/0263585 A1 * 10/2008 Gell .................... H04N 21/4788
725/32
2012/0317210 A1 * 12/2012 Fisher .................. H04L 51/216
709/206

(Continued)

FOREIGN PATENT DOCUMENTS

CN    103455253 A    12/2013
CN    105916037 A    8/2016
(Continued)

OTHER PUBLICATIONS

International Search Report dated Feb. 4, 2021 in International Application No. PCT/CN2020/125795.

(Continued)

*Primary Examiner* — Dino Kujundzic

(57) ABSTRACT

A video-based interaction implementation method includes the following: At least one video is presented in an interface; an interactive video input by a user based on a presented video is acquired, and an association relationship is established between the presented video and the interactive video; and the interactive video is presented based on the association relationship.

12 Claims, 15 Drawing Sheets

(56) References Cited

U.S. PATENT DOCUMENTS

| | | | |
|---|---|---|---|
| 2013/0083906 A1* | 4/2013 | Roberts | H04M 1/72439 379/88.13 |
| 2014/0150029 A1* | 5/2014 | Avedissian | H04N 21/4722 725/60 |
| 2015/0293996 A1* | 10/2015 | Liu | G06F 16/739 707/723 |
| 2015/0302448 A1 | 10/2015 | Oh et al. | |
| 2016/0011758 A1* | 1/2016 | Dornbush | H04N 5/77 715/764 |
| 2018/0054652 A1* | 2/2018 | Jaini | G06F 16/738 |
| 2018/0129370 A1* | 5/2018 | Sessak | G06F 16/7834 |
| 2019/0377826 A1* | 12/2019 | Soni | G06F 16/78 |
| 2020/0257414 A1* | 8/2020 | Wang | G06F 3/04842 |
| 2021/0097105 A1* | 4/2021 | Al Majid | G06F 16/738 |

FOREIGN PATENT DOCUMENTS

| | | |
|---|---|---|
| CN | 106412648 A | 2/2017 |
| CN | 107038023 A | 8/2017 |
| CN | 108377334 A | 8/2018 |
| CN | 109376252 A | 2/2019 |
| CN | 111078901 A | 4/2020 |
| WO | 2017133562 A | 8/2017 |
| WO | WO2019192351 A1 | 10/2019 |

OTHER PUBLICATIONS

European Search Report dated Nov. 16, 2022 in European Patent Application No. 20906159.7 (10 pages).
Office Action dated Oct. 18, 2022 in corresponding IN Application No. 202227039181 (6 pages).

* cited by examiner

VIDEO-BASED INTERACTION IMPLEMENTATION METHOD AND APPARATUS, DEVICE AND MEDIUM

CROSS-REFERENCE TO RELATED APPLICATION(S)

This is a continuation of International Patent Application No. PCT/CN2020/125795, filed Nov. 2, 2020, which claims priority to Chinese Patent Application No. 201911360690.0 filed with the China National Intellectual Property Administration (CNIPA) on Dec. 25, 2019, the disclosures of which are incorporated herein by reference in its entirety.

TECHNICAL FIELD

The present disclosure relates to computer technology, for example, a video-based interaction implementation method and apparatus, a device, and a medium.

BACKGROUND

With the development and popularization of smart terminals, a large number of application programs are conveniently provided on the smart terminals for people to use. Various application functions are presented through an increasing number of manners. Text, audios, images, and videos have become means of information presentation and interaction.

Video can display the most abundant information, thereby becoming one of the data forms for presentation in various application programs. However, in the related art, a video is merely used for presentation, resulting in that the video could perform only a single function.

SUMMARY

The present disclosure provides a video-based interaction implementation method and apparatus, a device, and a medium so as to implement video-based information interaction, enriching the functions of a video and making the information interaction mode more flexible.

A video-based interaction implementation method is provided. The method includes the steps below.

At least one video is presented in an interface.

An interactive video input by a user based on a presented video is acquired, and an association relationship is established between the presented video and the interactive video.

The interactive video is presented based on the association relationship.

A video-based interaction implementation apparatus is also provided. The apparatus includes a video presentation module, an association relationship establishment module, and an interactive video presentation module.

The video presentation module is configured to present at least one video in an interface.

The association relationship establishment module is configured to acquire an interactive video input by a user based on a presented video and establish an association relationship between the presented video and the interactive video.

The interactive video presentation module is configured to present the interactive video based on the association relationship.

An electronic device is also provided. The electronic device includes one or more processing apparatuses and a storage apparatus configured to store one or more programs.

The one or more programs, when executed by the one or more processing apparatuses, cause the one or more processing apparatuses to perform the video-based interaction implementation method according to embodiments of the present disclosure.

A computer-readable storage medium is also provided. The computer-readable storage medium stores a computer program. When the computer program is executed by a processor, the video-based interaction implementation method according to embodiments of the present disclosure is performed.

DETAILED DESCRIPTION

Embodiments of the present disclosure will be described below with reference to the drawings. The drawings illustrate some embodiments of the present disclosure, but it should be understood that the present disclosure may be implemented in various manners. The drawings and embodiments of the present disclosure are merely for illustrative purposes.

The various steps recited in method embodiments of the present disclosure may be performed in a different order and/or in parallel. In addition, the method embodiments may include additional steps and/or omit the execution of illustrated steps.

As used herein, the term "include" and variations thereof are intended to be inclusive, that is, "including, but not limited to". The term "based on" is "at least partially based on". The term "an embodiment" refers to "at least one embodiment"; the term "another embodiment" refers to "at least one another embodiment"; the term "some embodiments" refers to "at least some embodiments". Related definitions of other terms are given in the description hereinafter.

Concepts such as "first" and "second" in the present disclosure are merely intended to distinguish one from another apparatus, module, or unit.

"One" and "a plurality" mentioned in the present disclosure are illustrative, and should be understood as "one or more" unless clearly expressed in the context.

The names of messages or information exchanged between multiple apparatuses in the embodiments of the present disclosure are only for illustrative purposes.

Figure 1A:
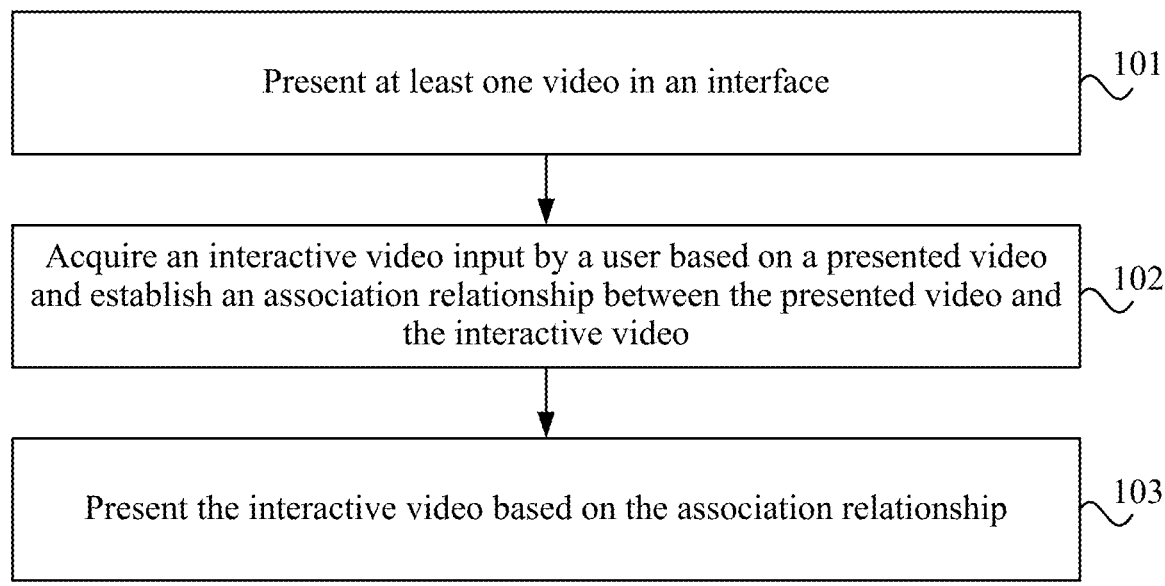
FIG. 1A is a flowchart of a video-based interaction implementation method according to an embodiment of the present disclosure.

FIG. 1A is a flowchart of a video-based interaction implementation method according to an embodiment of the present disclosure. Embodiments of the present disclosure may be applied to the case of video-based interaction. The method is performed by a video-based interaction implementation apparatus. The apparatus may be implemented by software and/or hardware and may be integrated into an electronic device. As shown in FIG. 1, the method includes the steps below.

In step 101, at least one video is presented in an interface.

Optionally, the interface may be a topic list interface. A topic is a pre-created video theme. Before posting a video, a posting user establishes an association relationship between the video and one topic through setting the topic to which the video belongs, thereby indicating that the posted video is a video posted for the topic and represents the viewpoint of the posting user regarding the topic.

Optionally, the method further includes acquiring a topic creation request of the user and creating a topic according to the topic creation request.

The topic creation request of the user carries the customized topic. The customized topic is a topic customized by the user according to the user's interests. The user sends the topic creation request to request the customized topic to be created. After the topic creation request of the user is acquired, the customized topic is created according to the topic creation request.

In one example, the user enters a topic creation interface through clicking a preset topic creation control. The user inputs a customized topic in a topic input region in the topic creation interface and then performs a triggering operation on a request sending control in the topic creation interface to input a topic creation request carrying the customized topic.

Accordingly, the user requests the creation of the topic which the user is interested in. Therefore, regarding the topic which the user is interested in, the user posts the video and express a viewpoint.

Optionally, the topic is created by performing topic clustering according to a plurality of videos historically posted by a plurality of users.

In one embodiment, the videos historically posted by the users are acquired. The acquired videos are analyzed and processed to extract topics of the videos. Then topic clustering is performed according to the similarity of the topics of the videos. For each topic class obtained through clustering, the most representative topic among all topics affiliated to a topic class is selected according to the average similarity of the topics to serve as a representative topic of the topic class. The representative topic of each topic class is created as a topic.

Each topic has a corresponding topic list interface. A topic list interface is an interface used for presenting a plurality of videos associated with a topic in list items. That is, a plurality of videos belonging to the same topic are presented in list items in a topic list interface. The user enters the topic list interface of one topic, browses videos posted by other users regarding the topic in the topic list interface, and learns viewpoints of the other users regarding the topic.

Optionally, the step in which the at least one video is presented in the interface may include that a plurality of videos associated with a current topic are presented in list items in a topic list interface.

A current interface viewed by the user through the electronic device is a topic list interface. A topic corresponding to the topic list interface is the current topic. A list item in the topic list interface is used for presenting the display information of a video associated with the current topic. The display information can be used for presenting the core content of the video to the user.

Optionally, the display information may be a cover image or a preview video. A user posting the video can select one image frame from all image frames of the video to serve as the cover image of the video. The user posting the video can select one video with a set duration from the video to serve as the preview video of the video.

The user learns a viewpoint of one other user regarding the current topic according to the core content of the video presented through the display information. Alternatively, the user clicks the display information of the video to enter a video playing interface of the video and watch the entire video, thereby learning the viewpoint of the other user regarding the current topic.

Figure 1B:
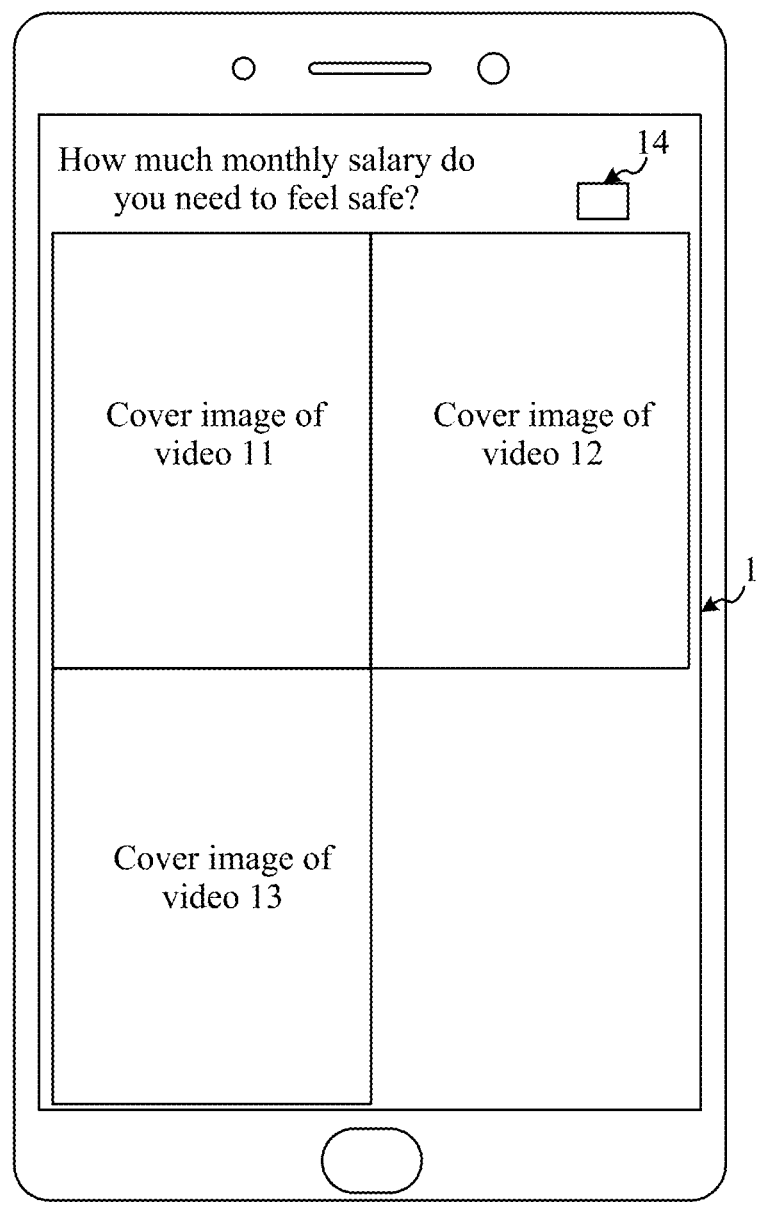
FIG. 1B is a diagram of a topic list interface according to an embodiment of the present disclosure.

In one example, three topics associated with a current topic "How much monthly salary do you need to feel safe?", that is, video 11, video 12, and video 13, are displayed in list items in a topic list interface 1 as shown in FIG. 1B. Three list items in the topic list interface 1 are used for presenting the cover image of video 11, the cover image of video 12, and the cover image of video 13 respectively.

Optionally, an interface may be a video playing interface.

Optionally, the step in which the at least one video is presented in the interface may include that a current video is played and presented in a video playing interface.

A current interface viewed by the user through the electronic device is a video playing interface. The current video is the video presented in the video playing interface. The user watches the current video in the video playing interface and learns a viewpoint of a user posting the current video regarding a topic to which the current video belongs.

Figure 1C:
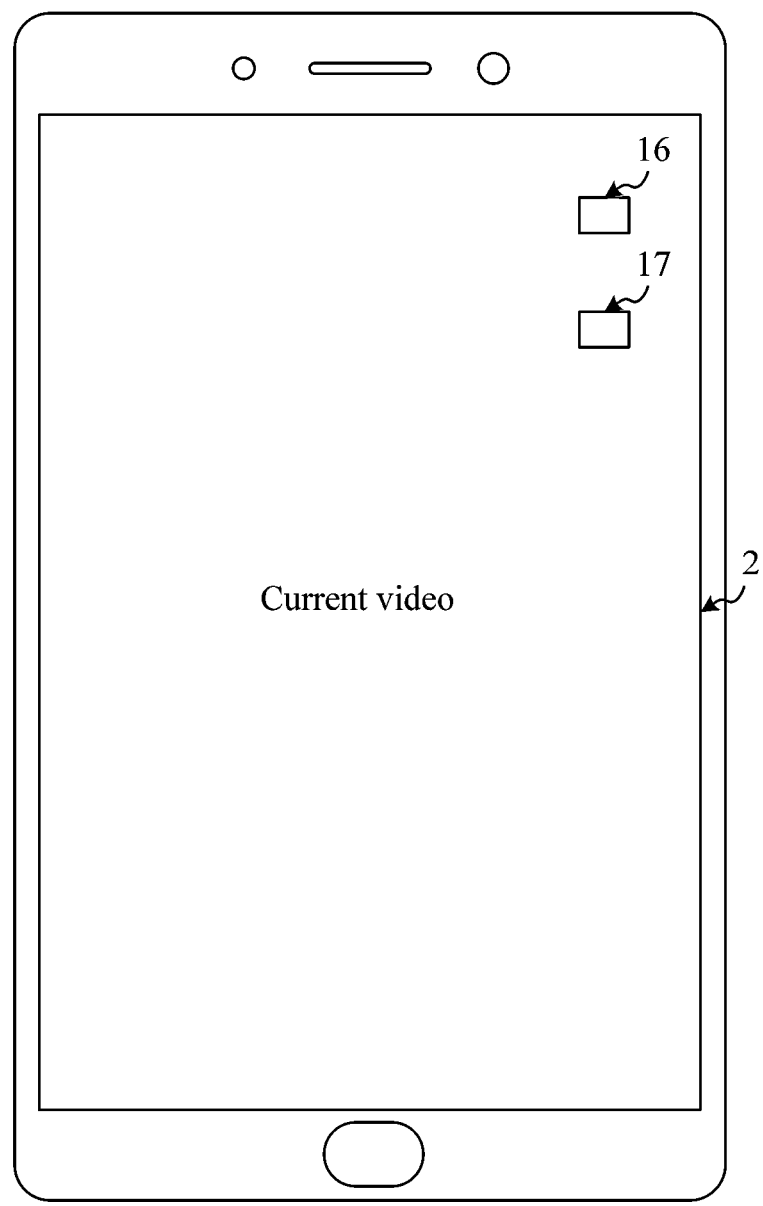
FIG. 1C is a diagram of a video playing interface according to an embodiment of the present disclosure.

In one example, the user watches a current video in a video playing interface 2 as shown in FIG. 1C and learns a viewpoint of a user posting the current video regarding a topic to which the current video belongs.

In step 102, an interactive video input by the user based on a presented video is acquired, and an association relationship is established between the presented video and the interactive video.

Optionally, the step in which the interactive video input by the user based on the presented video is acquired and the association relationship is established between the presented video and the interactive video may include the following steps: A topic discussion entrance is provided in the topic list interface; and in the case where the triggering of the topic discussion entrance by the user is detected, the interactive video input by the user based on a video presented in the topic list interface is acquired, and an association relationship between the current topic and the interactive video is established.

The topic discussion entrance provided in the topic list interface may be a topic discussion entrance control. The topic discussion entrance is used for inputting a topic discussion instruction. The topic discussion instruction is an instruction used for entering a shooting preview interface corresponding to the video presented in the topic list interface so as to perform video shooting.

A list item in the topic list interface is used for presenting the display information of a video associated with the current topic. After the user learns a viewpoint of the other user regarding the current topic according to the core content of the video presented through the display information, the user performs a triggering operation on the topic discussion entrance control to input the topic discussion instruction so as to directly enter the shooting preview interface corresponding to the video presented in the topic list interface and perform video shooting.

Optionally, the topic discussion entrance control may be designed as a topic discussion entrance icon. The form of the topic discussion entrance icon may be set according to an actual situation.

The shooting preview interface may be provided with a shooting control. Optionally, the shooting control may be designed as a shooting icon. When the user presses the shooting icon, video shooting starts. When the user no longer presses the shooting icon, video shooting stops. In the process of shooting a video, the user can express his viewpoint regarding the current topic.

The shot video is the interactive video input by the user based on the video presented in the topic list interface. After it is determined that the user completes video shooting, the shot video is acquired and the current topic is set to be a topic to which the shot video belongs. Accordingly, the association relationship between the current topic and the interactive video is established.

Figure 1D:
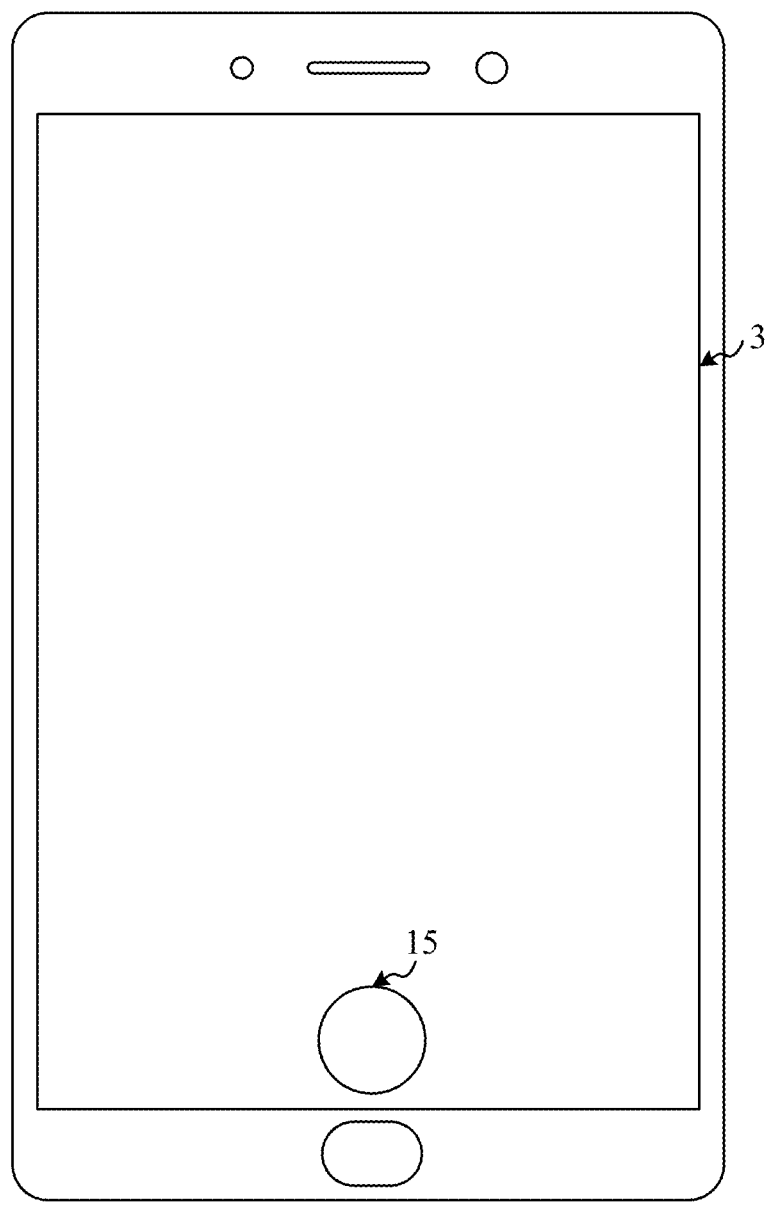
FIG. 1D is a diagram of a shooting preview interface according to an embodiment of the present disclosure.

In one example, a topic discussion entrance icon 14 is provided in the topic list interface 1 as shown in FIG. 1B. The user performs a triggering operation on the topic discussion entrance icon 14 to input a topic discussion instruction so as to directly enter a shooting preview interface 3, as shown in FIG. 1D, corresponding to a video presented in the topic list interface 1 and perform video shooting. The shooting preview interface 3 is provided with a shooting icon 15. When the user presses the shooting icon 15, video shooting starts. When the user no longer presses the shooting icon 15, video shooting stops. In the process of shooting a video, the user can express his viewpoint regarding the current topic. After it is determined that the user completes video shooting, the current topic "How much monthly salary do you need to feel safe?" is set to be a topic to which the shot video belongs. Accordingly, an association relationship between the current topic "How much monthly salary do you need to feel safe?" and the interactive video is established.

Optionally, the step in which the interactive video input by the user based on the presented video is acquired and the association relationship is established between the presented video and the interactive video may include the following steps: A topic discussion entrance or a reply entrance is provided in the video playing interface of the presented video; in the case where the triggering of the topic discussion entrance by the user is detected, the interactive video input by the user based on the presented video is acquired, and an association relationship between the interactive video and a topic to which the presented video belongs is established; and in the case where the triggering of the reply entrance by the user is detected, the interactive video input by the user based on the presented video is acquired, and the association relationship between the presented video and the interactive video is established.

Optionally, the topic discussion entrance provided in the video playing interface may be a topic discussion entrance control. The topic discussion entrance is used for inputting a topic discussion instruction. The topic discussion instruction is an instruction used for entering the shooting preview interface corresponding to the topic to which the video presented in the video playing interface belongs so as to perform video shooting.

The current video is played and presented in the video playing interface. The current video is the video presented in the video playing interface. After the user watches the current video in the video playing interface and learns the viewpoint of the user posting the current video regarding the topic to which the current video belongs, the user performs a triggering operation on the topic discussion entrance control to input the topic discussion instruction so as to directly enter the shooting preview interface corresponding to the topic to which the current video belongs and perform video shooting.

Optionally, the topic discussion entrance control may be designed as a topic discussion entrance icon.

The shooting preview interface may be provided with a shooting control. Optionally, the shooting control may be designed as a shooting icon. When the user presses the shooting icon, video shooting starts. When the user no longer presses the shooting icon, video shooting stops.

In the process of shooting a video, the user can express his viewpoint regarding the topic to which the current video belongs.

The shot video is the interactive video input by the user based on the presented video. After it is determined that the user completes video shooting, the topic to which the current video is set to be a topic to which the shot video belongs. That is, the topic to which the presented video belongs is set to be the topic to which the shot video belongs. Accordingly, the association relationship between the interactive video and the topic to which the presented video belongs is established. Through the interactive video, the user participates in the discussion about the topic to which the presented video belongs. The user presents his viewpoint through the interactive video regarding the topic to which the presented video belongs.

Optionally, the reply entrance provided in the video playing interface may be a reply entrance control. The replay entrance control is used for inputting a replay instruction. The reply instruction is an instruction used for entering the shooting preview interface corresponding to the video presented in the video playing interface so as to perform video shooting.

The current video is played and presented in the video playing interface. The current video is the video presented in the video playing interface. After the user watches the current video in the video playing interface and learns the viewpoint of the user posting the current video, the user performs a triggering operation on the reply entrance control to input the reply instruction so as to directly enter the shooting preview interface corresponding to the current video and perform video shooting.

Optionally, the reply entrance control may be designed as a reply entrance icon. The form of the reply entrance icon may be set according to an actual situation.

The shooting preview interface may be provided with a shooting control. Optionally, the shooting control may be designed as a shooting icon. When the user presses the shooting icon, video shooting starts. When the user no longer presses the shooting icon, video shooting stops. In the process of shooting a video, the user can express his viewpoint regarding the viewpoint in the current video.

The shot video is the interactive video input by the user based on the presented video. After it is determined that the user completes video shooting, the association relationship between the current video and the shot video is established; that is, the association relationship between the presented video and the interactive video is established. The association relationship between the presented video and the interactive video is a reply relationship. That is, the interactive video is a reply video of the presented video. The user replies to the viewpoint in the presented video through the interactive video.

In one example, a topic discussion entrance icon 16 and a reply entrance icon 17 are provided in the video playing interface 2 as shown in FIG. 1C. The user performs a triggering operation on the topic discussion entrance icon 16 to input a topic discussion instruction so as to directly enter the shooting preview interface corresponding to the topic to which the current video belongs and perform video shooting. Alternatively, the user performs a triggering operation on the reply entrance icon 17 to input a reply instruction so as to directly enter the shooting preview interface corresponding to the current video and perform video shooting.

In step 103, the interactive video is presented based on the association relationship.

Optionally, the step in which the interactive video is presented based on the association relationship may include that a plurality of videos, among which the association relationship is already established, are acquired and that the videos are presented in list items in a topic list interface of a topic to which the videos belong.

Optionally, the step in which the videos, among which the association relationship is already established, are acquired and in which the videos are presented in list items in the topic list interface of the topic to which the videos belong may include that the videos associated with the current topic are acquired after the interactive video input by the user based on the video presented in the topic list interface is acquired and the association relationship between the current topic and the interactive video is established. The videos associated with the current topic include the interactive video of the user. Then the videos associated with the current topic are presented in list items in a topic list interface of the current topic so that the interactive video input by the user based on the video presented in the topic list interface is posted in the topic list interface of the current topic.

Accordingly, the user participates in the discussion about the current topic through the interactive video. Other users may browse the interactive video, posted by the user regarding the current topic, in the topic list interface of the current topic; and through the interactive video of the user, the other users may learn the viewpoint of the user regarding the current topic.

Figure 1E:
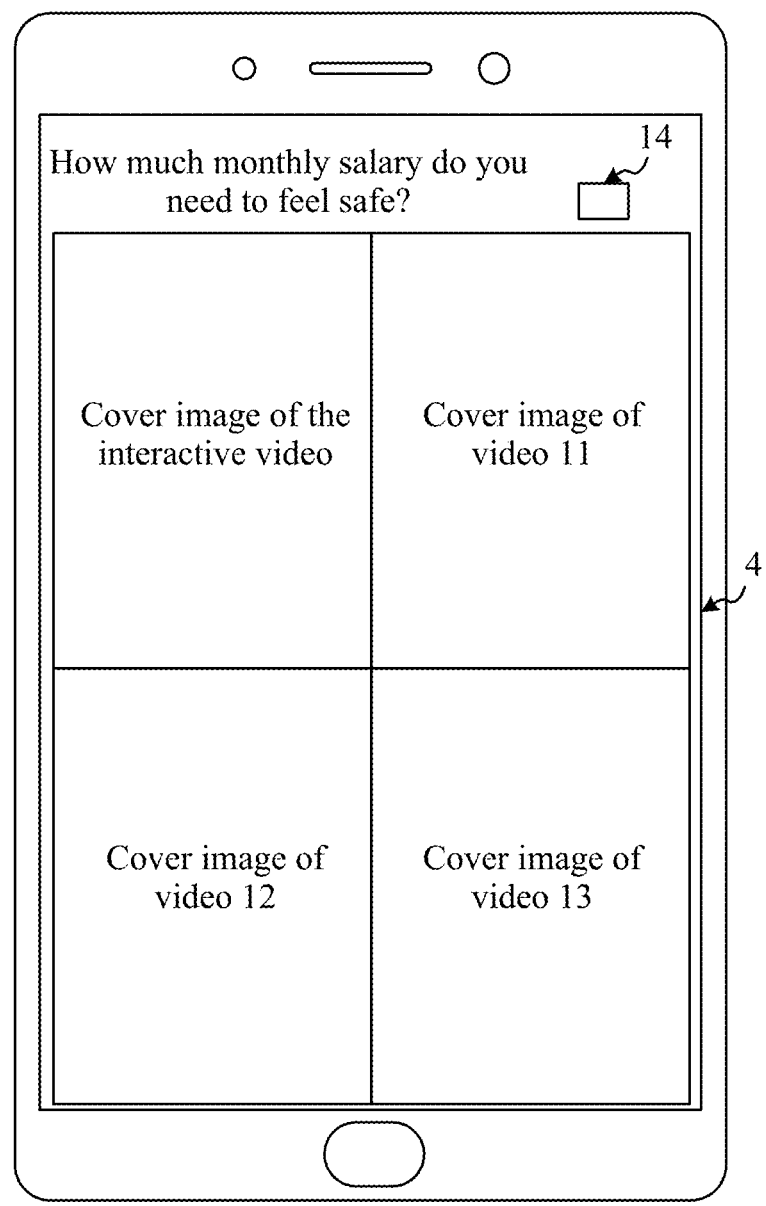
FIG. 1E is a diagram of a topic list interface according to an embodiment of the present disclosure.

In one example, the interactive video input by the user based on the video presented in the topic list interface 1 as shown in FIG. 1B is acquired, and an association relationship between the current topic "How much monthly salary do you need to feel safe?" and the interactive video is established. After that, a plurality of videos associated with the current topic "How much monthly salary do you need to feel safe?", the interactive video, video 11, video 12, and video 13, are presented in list items so that a topic list interface 4 as shown in FIG. 1E is obtained. Four list items in the topic list interface 4 are used for presenting the cover image of the interactive video, the cover image of video 11, the cover image of video 12, and the cover image of video 13 respectively. The user participates in the discussion about the current topic "How much monthly salary do you need to feel safe?" through the interactive video. Other users may browse the interactive video, posted by the user regarding the current topic, in the topic list interface of the current topic; and through the interactive video of the user, the other users may learn the viewpoint of the user regarding the current topic.

Optionally, the step in which the videos, among which the association relationship is already established, are acquired and in which the videos are presented in list items in the topic list interface of the topic to which the videos belong may include that the videos associated with the topic to which the presented video belongs are acquired after the interactive video input by the user based on the video presented in the video playing interface is acquired and the association relationship between the interactive video and the topic to which the presented video belongs is established. The videos associated with the topic to which the presented video belongs include the interactive video of the user. Then the videos associated with the topic to which the presented video belongs are presented in list items in a topic list interface of the topic to which the presented video belongs so that the interactive video input by the user based on the video presented in the video playing interface is posted in the topic list interface of the topic to which the presented video belongs.

Accordingly, through the interactive video, the user participates in the discussion about the topic to which the presented video belongs. Other users may browse the interactive video, posted by the user regarding the topic to which the presented video belongs, in the topic list interface of the topic to which the presented video belongs; and through the interactive video of the user, the other users may learn the viewpoint of the user regarding the topic to which the presented video belongs.

Figure 1F:
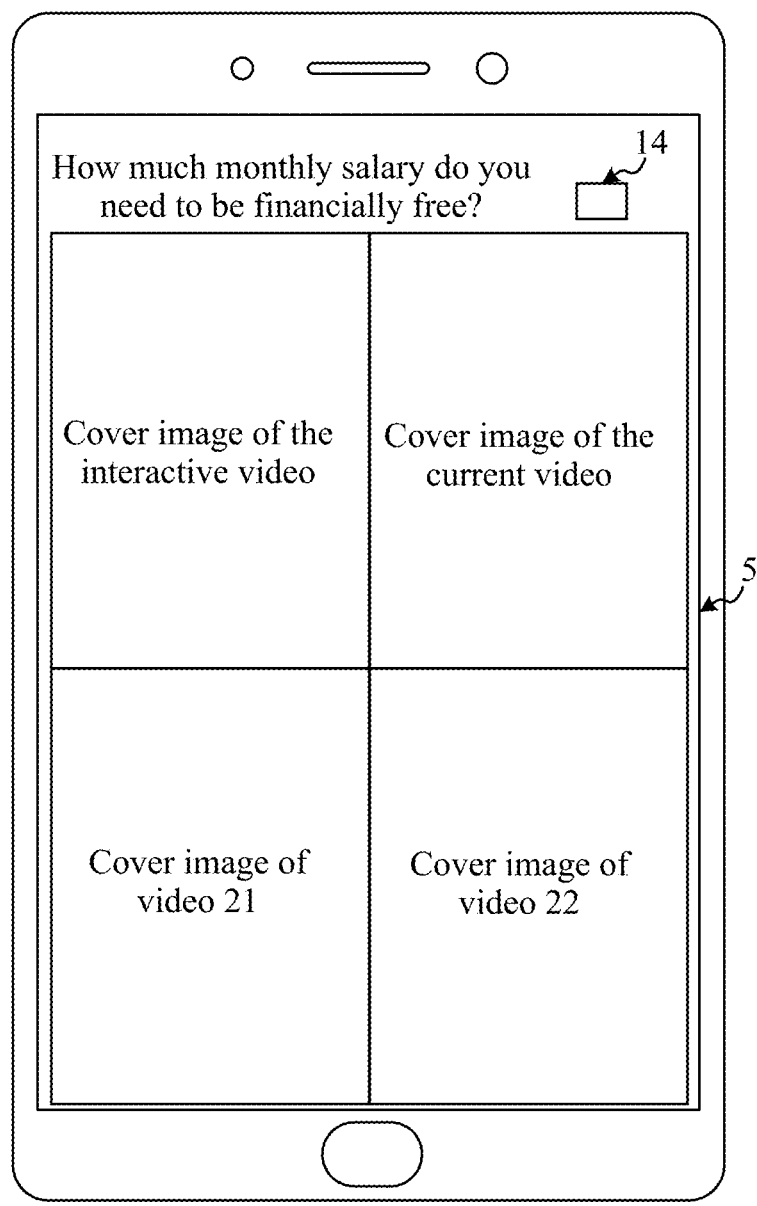
FIG. 1F is a diagram of a topic list interface according to an embodiment of the present disclosure.

In one example, as shown in FIG. 1C, the current video is the video presented in the video playing interface 2. The topic to which the presented video belongs is a topic "How much monthly salary do you need to be financially free?" The interactive video input by the user based on the video presented in the video playing interface 2 is acquired, and an association relationship between the interactive video and the topic to which the presented video belongs is established. After that, four videos associated with the topic to which the presented video belongs, that is, the interactive video, the current video, video 21, and video 22, are presented in list items so that a topic list interface 5 as shown in FIG. 1F is obtained. Four list items in the topic list interface 5 are used for presenting the cover image of the interactive video, the cover image of the current video, the cover image of video 21, and the cover image of video 22. Through the interactive video, the user participates in the discussion about the topic "How much monthly salary do you need to be financially free?" to which the presented video belongs. Other users may browse the interactive video, posted by the user regarding the topic to which the presented video belongs, in the topic list interface of the topic to which the presented video belongs; and through the interactive video of the user, the other users may learn the viewpoint of the user regarding the topic to which the presented video belongs.

Optionally, the step in which the interactive video is presented based on the association relationship may include that the interactive video is played in the video playing interface and that a topic list interface entrance or an associated video entrance is provided in the video playing interface. A topic list interface is a list interface of a topic to which the at least one video associated with the interactive video belongs. An associated video is one of the at least one video associated with the interactive video.

Optionally, the interactive video is played in the video playing interface, and the topic list interface entrance is provided in the video playing interface. The topic list interface is the list interface of the topic to which the at least one video associated with the interactive video belongs.

Optionally, the videos associated with the current topic are acquired after the interactive video input by the user based on the video presented in the topic list interface is acquired and the association relationship between the current topic and the interactive video is established. Then the videos associated with the current topic are presented in list items in the topic list interface of the current topic so as to acquire the list interface of the topic to which the at least one video associated with the interactive video belongs. The posting user inputs the interactive video based on the video presented in the topic list interface. The interactive video is played in the video playing interface, and the topic list interface entrance is provided in the video playing interface.

The topic list interface entrance provided in the video playing interface may be a topic list interface entrance control. The topic list interface entrance control is used for inputting a topic list interface entering instruction. The topic list interface entering instruction is an instruction used for entering the list interface of the topic to which the at least one video associated with the interactive video belongs. The user performs a triggering operation on the topic list interface entrance control provided in the video playing interface to input the topic list interface entering instruction so as to directly enter the list interface of the topic to which the at least one video associated with the interactive video belongs.

Optionally, the topic list interface entrance control may be designed as a topic list interface entrance icon. The form of the topic list interface entrance icon may be set according to an actual situation.

Figure 1G:
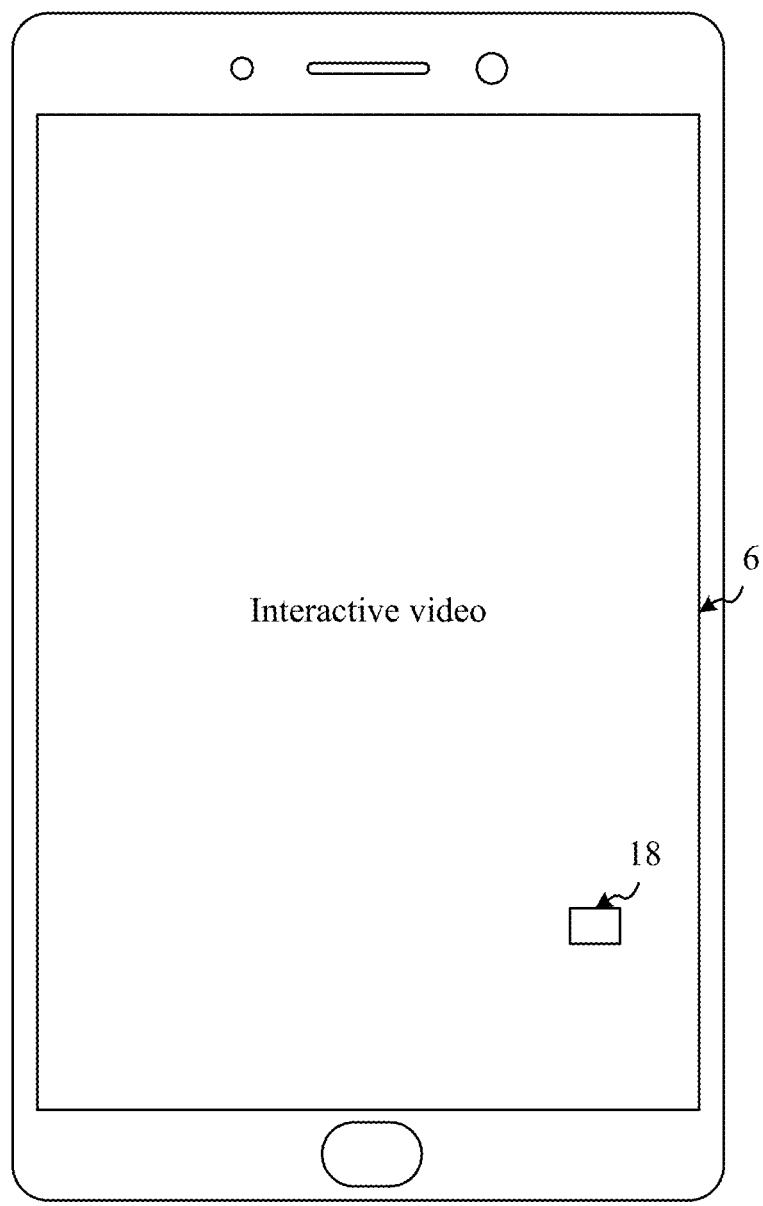
FIG. 1G is a diagram of a video playing interface according to an embodiment of the present disclosure.

In one example, the interactive video input by the user based on the video presented in the topic list interface 1 as shown in FIG. 1B is acquired, and the association relationship between the current topic "How much monthly salary do you need to feel safe?" and the interactive video is established. After that, a plurality of videos associated with the current topic "How much monthly salary do you need to feel safe?", the interactive video, video 11, video 12, and video 13, are presented in list items so that the topic list interface 4 as shown in FIG. 1E is obtained. The topic list interface 4 is the list interface of the topic to which the at least one video associated with the interactive video belongs. The interactive video is played in a video playing interface 6 as shown in FIG. 1G, and a topic list interface entrance icon 18 is provided in the video playing interface 6. The user performs a triggering operation on the topic list interface entrance icon 18 provided in the video playing interface 6 to input a topic list interface entering instruction so as to directly enter the topic list interface 4 as shown in FIG. 1E. Then the user browses an interactive video, posted by at least one user regarding the current topic, in the topic list interface 4 and learns a viewpoint of at least one user regarding the current topic.

Optionally, the videos associated with the topic to which the presented video belongs are acquired after the interactive video input by the user based on the video presented in the video playing interface is acquired and the association relationship between the interactive video and the topic to which the presented video belongs is established. Then the videos associated with the topic to which the presented video belongs are presented in list items in the topic list interface of the topic to which the presented video belongs so as to acquire the list interface of the topic to which the at least one video associated with the interactive video belongs. The posting user inputs the interactive video based on the video presented in the video playing interface. The interactive video is played in the video playing interface, and the topic list interface entrance is provided in the video playing interface.

The topic list interface entrance provided in the video playing interface may be a topic list interface entrance control. The topic list interface entrance control is used for inputting a topic list interface entering instruction. The topic list interface entering instruction is an instruction used for entering the list interface of the topic to which the at least one video associated with the interactive video belongs. The user performs a triggering operation on the topic list interface entrance control provided in the video playing interface to input the topic list interface entering instruction so as to directly enter the list interface of the topic to which the at least one video associated with the interactive video belongs.

Optionally, the topic list interface entrance control may be designed as a topic list interface entrance icon. The form of the topic list interface entrance icon may be set according to an actual situation.

In one example, as shown in FIG. 1C, the current video is the video presented in the video playing interface 2. The topic to which the presented video belongs is the topic "How much monthly salary do you need to be financially free?" The interactive video input by the user based on the video presented in the video playing interface 2 is acquired, and the association relationship between the interactive video and the topic to which the presented video belongs is established. After that, four videos associated with the topic to which the presented video belongs, that is, the interactive video, the current video, video 21, and video 22, are presented in list items so that the topic list interface 5 as shown in FIG. 1F is obtained. The topic list interface 5 is the list interface of the topic to which the at least one video associated with the interactive video belongs. The interactive video is played in the video playing interface 6 as shown in FIG. 1G, and the topic list interface entrance icon 18 is provided in the video playing interface 6. The user performs a triggering operation on the topic list interface entrance icon 18 provided in the video playing interface 6 to input a topic list interface entering instruction so as to directly enter the topic list interface 5 as shown in FIG. 1F. Then the user browses an interactive video, posted by at least one user regarding the topic to which the presented video belongs, in the topic list interface 5 and learns a viewpoint of at least one user regarding the topic to which the presented video belongs.

Optionally, the step in which the interactive video is presented based on the association relationship may include that the interactive video is played in the video playing interface and that the associated video entrance is provided in the video playing interface. An associated video is one of the at least one video associated with the interactive video.

Optionally, the interactive video is a reply video of the associated video. After the user watches the associated video in the video playing interface and learns a viewpoint of a user posting the associated video, the user performs a triggering operation on the reply entrance control to input the reply instruction so as to directly enter the shooting preview interface corresponding to the current video and perform video shooting. After it is determined that the user completes video shooting, an association relationship between the associated video and the shot video is established. The association relationship between the associated video and the interactive video is a reply relationship. The user replies to the viewpoint in the associated video through the interactive video.

The posting user inputs the interactive video based on the associated video. The interactive video is played in the video playing interface, and the associated video entrance is provided in the video playing interface. Optionally, the associated video entrance provided in the video playing interface of the interactive video may be an associated video entrance control. The associated video entrance control is used for inputting an associated video entering instruction. The associated video entering instruction is an instruction used for entering the video playing interface of the associated video.

The interactive video is played in the video playing interface, and the associated video entrance is provided in the video playing interface. The user performs a triggering operation on the associated video entrance control to input the associated video entering instruction so as to directly enter the video playing interface of the associated video, to watch the associated video played in the video playing interface, and to learn that the interactive video is a reply to the viewpoint in the associated video.

Optionally, the associated video entrance control may be designed as an associated video entrance icon. The form of the associated video entrance icon may be set according to an actual situation.

Figure 1H:
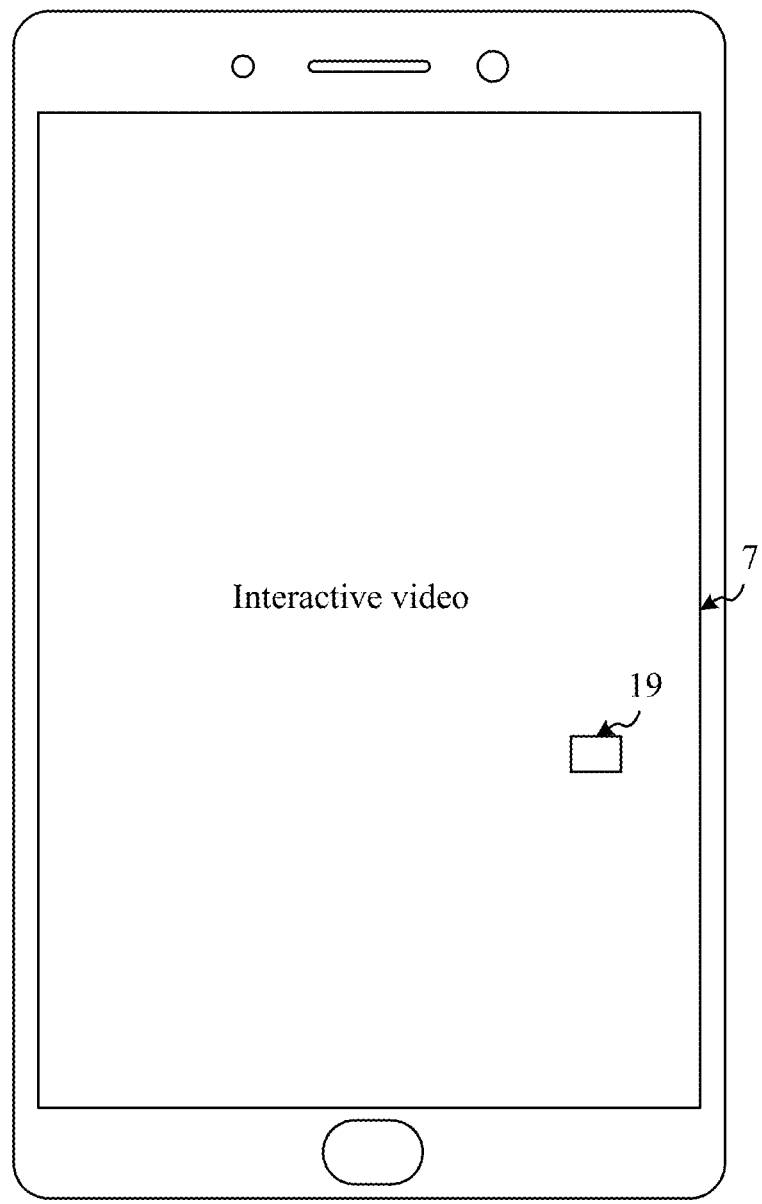
FIG. 1H is a diagram of a video playing interface according to an embodiment of the present disclosure.
Figure 1I:
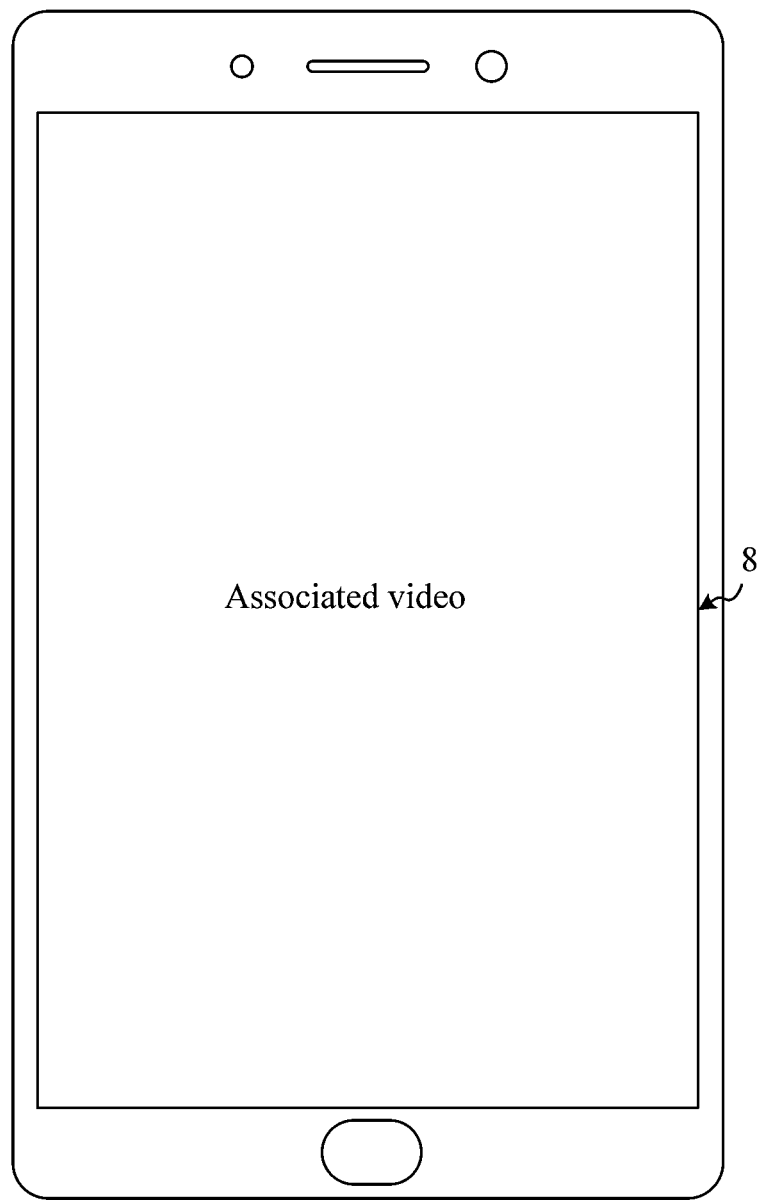
FIG. 1I is a diagram of a video playing interface according to an embodiment of the present disclosure.

In one example, the interactive video is played in a video playing interface 7 as shown in FIG. 1H, and an associated video entrance icon 19 is provided in the video playing interface 7. The user performs a triggering operation on the associated video entrance icon 19 provided in the video playing interface 7 to input an associated video entering instruction so as to directly enter a video playing interface 8, as shown in FIG. 1I, of the associated video, to watch the associated video played in the video playing interface 8, and to learn that the interactive video is a reply to the viewpoint in the associated video.

Optionally, the associated video is a reply video of the interactive video. After one other user watches the interactive video in the video playing interface and learns the viewpoint of the user posting the interactive video, the other user performs a triggering operation on the reply entrance control to input the reply instruction so as to directly enter the shooting preview interface corresponding to the interactive video and perform video shooting. After it is determined that the other user completes video shooting, an association relationship between the interactive video and a shot video is established. The shot video is the associated video. The association relationship between the associated video and the interactive video is a reply relationship. The other user posts the associated video and replies to the viewpoint in the interactive video through the associated video. The interactive video may have a plurality of reply videos, that is, a plurality of associated videos.

Optionally, the associated video entrance provided in the video playing interface of the interactive video may be an associated video entrance control. The associated video entrance control is used for inputting an associated video entering instruction. The associated video entering instruction is an instruction used for entering a video list interface of the associated video. The video list interface is an interface used for presenting a plurality of associated videos of the interactive video as list items.

The interactive video is played in the video playing interface, and the associated video entrance is provided in the video playing interface. The user performs a triggering operation on the associated video entrance control to input the associated video entering instruction so as to directly enter the video list interface of the associated videos and watch the associated videos replied by other users regarding the viewpoint in the interactive video.

Optionally, the associated video entrance control may be designed as an associated video entrance icon. The form of the associated video entrance icon may be set according to an actual situation.

Figure 1J:
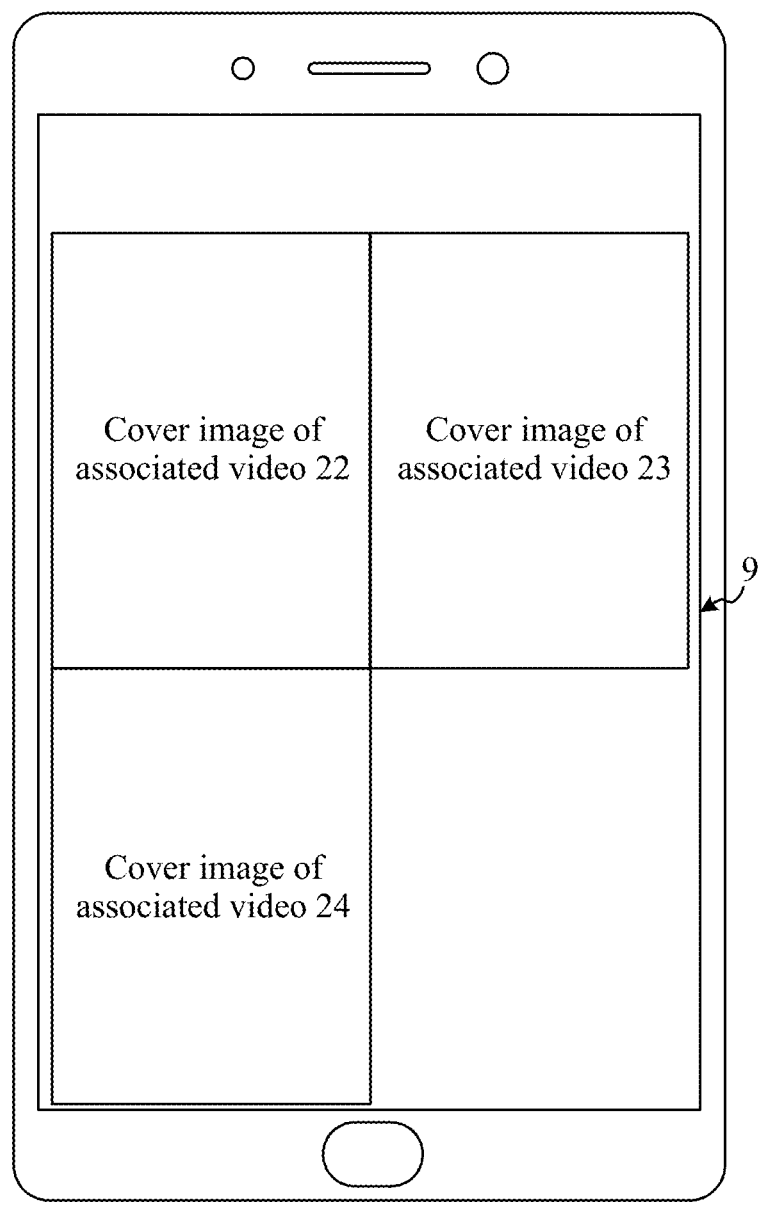
FIG. 1J is a diagram of a video list interface according to an embodiment of the present disclosure.

In one example, the interactive video is played in the video playing interface 7 as shown in FIG. 1H, and the associated video entrance icon 19 is provided in the video playing interface 7. The user performs a triggering operation on the associated video entrance icon 19 to input an associated video entering instruction so as to directly enter a video list interface 9, as shown in FIG. 1J, of the associated videos and watch the associated videos, that is, associated video 22, associated video 23, and associated video 24, replied by other users regarding the viewpoint in the interactive video.

Optionally, the method further includes that an interactive invitation is sent to an associated user of the interactive video according to the interactive video already input and posted by the user so as to request the associated user to input a new interactive video.

Optionally, before sending the interactive invitation to the associated user of the interactive video, the method may further include determining that a user specified by the posting user is the associated user; or determining an interested user according to the topic to which the interactive video belongs, and historical video posting behaviors of users other than the posting user, and taking the interested user as the associated user.

Optionally, the method further includes that in the case where a video is played in the video playing interface, the topic text of a topic to which the played video belongs is presented.

When the video is played in the video playing interface, the video is presented at a set position in the video playing interface. The topic text of the topic to which the played video belongs is presented so that a user watching the video can clearly learn the topic content of the topic to which the currently played video belongs. For example, the set position may be the top or bottom of the video playing interface.

Optionally, when acquiring the interactive video input by the user based on the presented video, the method further includes acquiring a viewpoint belonging to the topic of the interactive video input by the user.

Optionally, the step in which the viewpoint belonging to the topic of the interactive video input by the user is acquired may include that viewpoint channels are provided in a presentation interface of the presented video and that the viewpoint belonging to the topic is determined according to a viewpoint channel selected in the case where the user inputs the interactive video; alternatively, this step may include that the viewpoint belonging to the topic and configured for the interactive video by the user is acquired.

Optionally, after acquiring the viewpoint belonging to the topic of the interactive video input by the user, the method may further include that interactive videos that belong to viewpoints belonging to the same topic are intensively presented or counted.

Optionally, the method may further include that an entrance of browsing an interactive video of a recommended topic and/or a shooting entrance of shooting an interactive video of the recommended topic is presented in the shooting preview interface of the video posted by the user.

The shooting preview interface includes a shooting control. The user uses the shooting control to directly shoot a video and post the video. Optionally, the shooting control may be designed as a shooting icon. When the user presses the shooting icon, video shooting starts. When the user no longer presses the shooting icon, video shooting stops.

In one example, a topic which the user is interested in is acquired according to historical video posting behaviors of the user so as to serve as the recommended topic matching the user.

In another example, a plurality of topics are sequenced in an order of the numbers of interactive videos of the topics from high to low so as to obtain a topic sequencing result. A topic at a specified position in the topic sequencing result is acquired to serve as the recommended topic matching the user. For example, the specified position may be a first position.

Optionally, the entrance of browsing an interactive video of the recommended topic is presented in the shooting preview interface of the video posted by the user.

The entrance of browsing an interactive video of the recommended topic may be an entrance control of browsing the interactive video of the recommended topic. The entrance control of browsing the interactive video of the recommended topic is used for inputting an instruction of browsing the interactive video of the recommended topic. The instruction of browsing the interactive video of the recommended topic is an instruction used for entering a topic list interface of the recommended topic.

The user performs a triggering operation on the entrance control of browsing the interactive video of the recommended topic to input the instruction of browsing the interactive video of the recommended topic so as to directly enter the topic list interface of the recommended topic. The user browses the interactive video posted by one other user regarding the recommended topic in the topic list interface and learns a viewpoint of the other user regarding the recommended topic.

Accordingly, after the user enters the shooting preview interface for posting a video, the entrance of browsing the interactive video of the recommended topic leads the user to browse the interactive video posted by the other users regarding the recommended topic. In the process of browsing, the user may post an interactive video regarding the recommended topic and present his viewpoint regarding the recommended topic. Alternatively, the user may be led to input an interactive video regarding the interactive video of the other user and interact with the other user through videos.

Optionally, the entrance of shooting an interactive video of the recommended topic is presented in the shooting preview interface of the video posted by the user.

The entrance of shooting the interactive video of the recommended topic may be a control of shooting the interactive video of the recommended topic. The entrance control of shooting the interactive video of the recommended topic is used for inputting an instruction of shooting the interactive video of the recommended topic. The instruction of shooting the interactive video of the recommended topic is an instruction used for entering a shooting preview interface corresponding to the recommended topic. The user performs a triggering operation on the entrance control of shooting the interactive video of the recommended topic to input the instruction of shooting the interactive video of the recommended topic so as to directly enter the shooting preview interface corresponding to the recommended topic and perform video shooting.

The shooting preview interface may be provided with a shooting control. Optionally, the shooting control may be designed as a shooting icon. When the user presses the shooting icon, video shooting starts. When the user no longer presses the shooting icon, video shooting stops. In the process of shooting a video, the user can express his viewpoint regarding the recommended topic. The shot video is the interactive video input by the user based on the recommended video.

After presenting the entrance of shooting the interactive video of the recommended topic, the method may further include that the interactive video input by the user through shooting is acquired and that an association relationship between the interactive video and the recommended topic is established.

After it is determined that the user completes video shooting, the interactive video input by the user through shooting is acquired and the recommended topic is set to be a topic to which the shot video belongs. Accordingly, the association relationship between the interactive video and the recommended topic is established. Optionally, the interactive video input by the user based on the recommended topic is posted in the topic list interface of the recommended topic according to the association relationship between the interactive video and the recommended topic.

Accordingly, after the user enters the shooting preview interface for posting a video, the entrance of shooting the interactive video of the recommended topic leads the user to shoot an interactive video regarding the recommended topic and present his viewpoint regarding the recommended topic.

According to the technical solutions of embodiments of the present disclosure, at least one video is presented in an interface; an interactive video input by a user based on a presented video is acquired, and an association relationship is established between the presented video and the interactive video; and the interactive video is presented based on the association relationship. The information that the user posting the interactive video wants to express can be transmitted to other users through the interactive video. The establishment of the association relationship between the presented video and the interactive video can implement the information interaction between a user posting the presented video and the user posting the interactive video, thereby implementing video-based information interaction, enriching the functions of a video, and making the information interaction mode more flexible.

Figure 2:
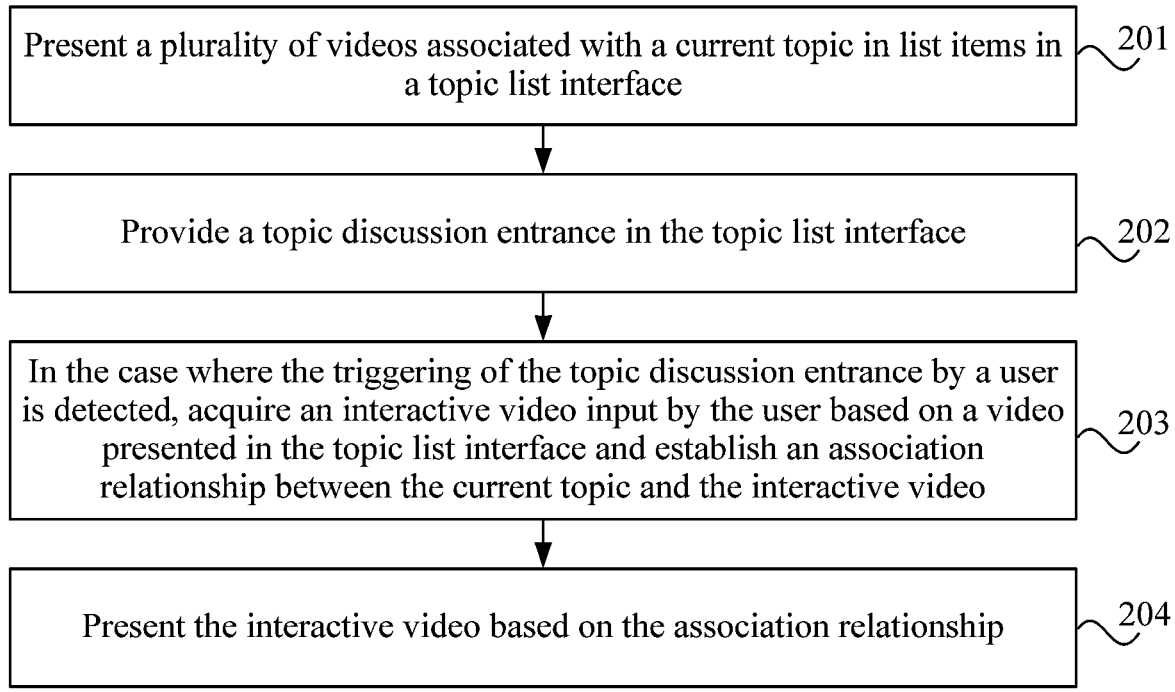
FIG. 2 is a flowchart of a video-based interaction implementation method according to an embodiment of the present disclosure.

FIG. 2 is a flowchart of a video-based interaction implementation method according to an embodiment of the present disclosure. This embodiment may be combined with multiple optional solutions in the preceding one or more embodiments. In this embodiment, the step in which at least one video is presented in an interface may include that a plurality of videos associated with a current topic are presented in list items in a topic list interface.

The step in which an interactive video input by a user based on a presented video is acquired and an association relationship is established between the presented video and the interactive video may include the following steps: A topic discussion entrance is provided in the topic list interface; and in the case where the triggering of the topic discussion entrance by the user is detected, the interactive video input by the user based on a video presented in the topic list interface is acquired, and an association relationship between the current topic and the interactive video is established.

As shown in FIG. 2, the method includes the steps below.

In step 201, a plurality of videos associated with a current topic are presented in list items in a topic list interface.

A current interface viewed by the user through the electronic device is a topic list interface. A topic corresponding to the topic list interface is the current topic. A list item in the topic list interface is used for presenting the display information of a video associated with the current topic. The display information can be used for presenting the core content of the video to the user.

Optionally, the display information may be a cover image or a preview video. A user posting the video can select one video image frame from all image frames of the video to serve as the cover image of the video. The user posting the video can select one video with a set direction from the video to serve as the preview video of the video.

The user learns a viewpoint of one other user regarding the current topic according to the core content of the video presented through the display information. Alternatively, the user clicks the display information of the video to enter a video playing interface of the video and watch the entire video, thereby learning the viewpoint of the other user regarding the current topic.

In one example, three topics associated with a current topic "How much monthly salary do you need to feel safe?", that is, video 11, video 12, and video 13, are displayed in list items in a topic list interface 1 as shown in FIG. 1B. Three list items in the topic list interface 1 are used for presenting the cover image of video 11, the cover image of video 12, and the cover image of video 13 respectively.

In step 202, a topic discussion entrance is provided in the topic list interface.

The topic discussion entrance provided in the topic list interface may be a topic discussion entrance control. The topic discussion entrance is used for inputting a topic discussion instruction. The topic discussion instruction is an instruction used for entering a shooting preview interface corresponding to the video presented in the topic list interface so as to perform video shooting.

In step 203, in the case where the triggering of the topic discussion entrance by the user is detected, an interactive video input by the user based on a video presented in the topic list interface is acquired, and an association relationship between the current topic and the interactive video is established.

A list item in the topic list interface is used for presenting the display information of a video associated with the current topic. After the user learns a viewpoint of the other user regarding the current topic according to the core content of the video presented through the display information, the user performs a triggering operation on the topic discussion entrance control to input the topic discussion instruction so as to directly enter the shooting preview interface corresponding to the video presented in the topic list interface and perform video shooting.

Optionally, the topic discussion entrance control may be designed as a topic discussion entrance icon. The form of the topic discussion entrance icon may be set according to an actual situation.

The shooting preview interface may be provided with a shooting control. Optionally, the shooting control may be designed as a shooting icon. When the user presses the shooting icon, video shooting starts. When the user no longer presses the shooting icon, video shooting stops. In the process of shooting a video, the user can express his viewpoint regarding the current topic.

The shot video is the interactive video input by the user based on the video presented in the topic list interface. After it is determined that the user completes video shooting, the shot video is acquired and the current topic is set to be a topic to which the shot video belongs. Accordingly, the association relationship between the current topic and the interactive video is established.

In one example, a topic discussion entrance icon 14 is provided in the topic list interface 1 as shown in FIG. 1B. The user performs a triggering operation on the topic discussion entrance icon 14 to input a topic discussion instruction so as to directly enter a shooting preview interface 3, as shown in FIG. 1D, corresponding to a video presented in the topic list interface 1 and perform video shooting. The shooting preview interface 3 is provided with a shooting icon 15. When the user presses the shooting icon 15, video shooting starts. When the user no longer presses the shooting icon 15, video shooting stops. In the process of shooting a video, the user can express his viewpoint regarding the current topic. After it is determined that the user completes video shooting, the current topic "How much monthly salary do you need to feel safe?" is set to be a topic to which the shot video belongs. Accordingly, an association relationship between the current topic "How much monthly salary do you need to feel safe?" and the interactive video is established.

In step 204, the interactive video is presented based on the association relationship.

Optionally, the step in which the interactive video is presented based on the association relationship may include that a plurality of videos, among which the association relationship is already established, are acquired and that the videos are presented in list items in a topic list interface of a topic to which the videos belong.

Optionally, the step in which the videos, among which the association relationship is already established, are acquired and in which the videos are presented in list items in the topic list interface of the topic to which the videos belong may include that the videos associated with the current topic are acquired after the interactive video input by the user based on the video presented in the topic list interface is acquired, and the association relationship between the current topic and the interactive video is established. The videos associated with the current topic include the interactive video of the user. Then the videos associated with the current topic are presented in list items in a topic list interface of the current topic so that the interactive video input by the user based on the video presented in the topic list interface is posted in the topic list interface of the current topic.

Accordingly, the user participates in the discussion about the current topic through the interactive video. Other users may browse the interactive video, posted by the user regarding the current topic, in the topic list interface of the current topic; and through the interactive video of the user, the other users may learn the viewpoint of the user regarding the current topic.

In one example, the interactive video input by the user based on the video presented in the topic list interface 1 as shown in FIG. 1B is acquired, and the association relationship between the current topic "How much monthly salary do you need to feel safe?" and the interactive video is established. After that, a plurality of videos associated with the current topic "How much monthly salary do you need to feel safe?", that is, the interactive video, video 11, video 12, and video 13, are presented in list items so that the topic list interface 4 as shown in FIG. 1E is obtained. Four list items in the topic list interface 4 are used for presenting the cover image of the interactive video, the cover image of video 11, the cover image of video 12, and the cover image of video 13 respectively. The user participates in the discussion about the current topic "How much monthly salary do you need to feel safe?" through the interactive video. Other users may browse the interactive video, posted by the user regarding the current topic, in the topic list interface of the current topic; and through the interactive video of the user, the other users may learn the viewpoint of the user regarding the current topic.

According to the technical solutions of embodiments of the present disclosure, a plurality of videos associated with a current topic are presented in list items in a topic list interface; a topic discussion entrance is provided in the topic list interface; and in the case where the triggering of the topic discussion entrance by a user is detected, an interactive video input by the user based on a video presented in the topic list interface is acquired, and an association relationship between the current topic and the interactive video is established. According to the association relationship between the current topic and the interactive video, the interactive video input by the user based on the current topic can be posted in the topic list interface of the current topic so that the user participates in the discussion about the current topic. The information that the user posting the interactive video wants to express can be transmitted to other users through the interactive video.

Figure 3:
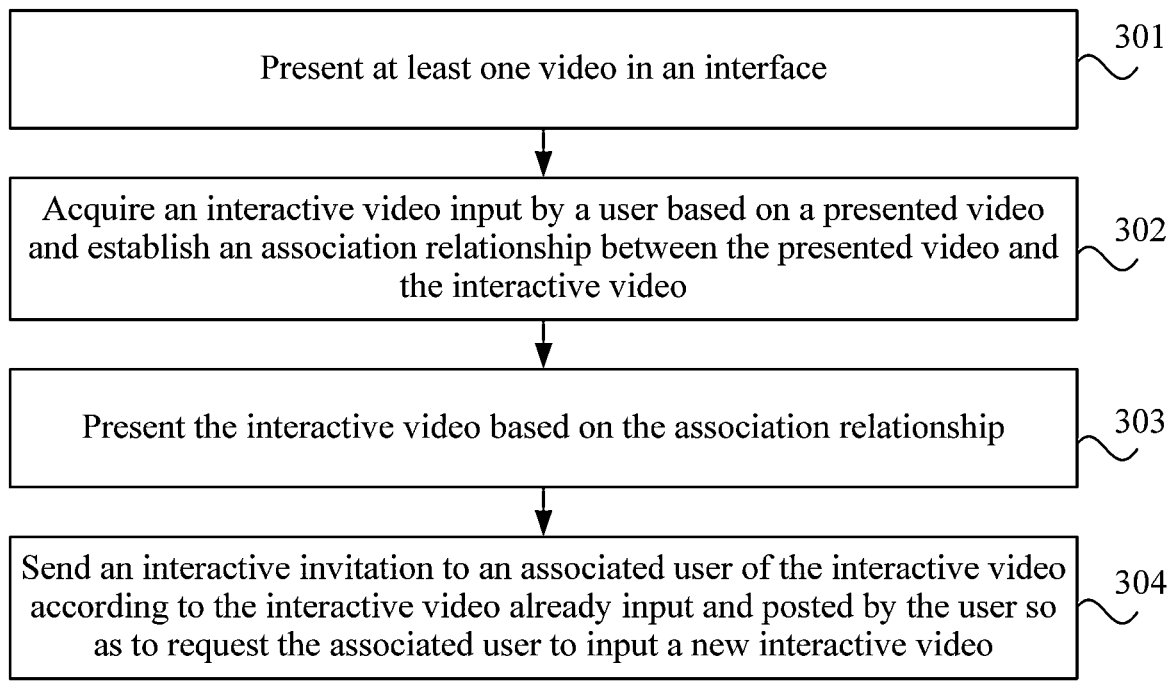
FIG. 3 is a flowchart of a video-based interaction implementation method according to an embodiment of the present disclosure.

FIG. 3 is a flowchart of a video-based interaction implementation method according to an embodiment of the present disclosure. This embodiment may be combined with multiple optional solutions in the preceding one or more embodiments. In this embodiment, the method further includes that an interactive invitation is sent to an associated user of an interactive video according to the interactive video already input and posted by a user so as to request the associated user to input a new interactive video.

As shown in FIG. 3, the method includes the steps below.

In step 301, at least one video is presented in an interface.

In step 302, an interactive video input by a user based on a presented video is acquired, and an association relationship is established between the presented video and the interactive video.

In step 303, the interactive video is presented based on the association relationship.

In step 304, an interactive invitation is sent to an associated user of the interactive video according to the interactive video already input and posted by the user so as to request the associated user to input a new interactive video.

After the interactive video input and posted by the user is determined, the interactive invitation is generated according to the interactive video. The interactive invitation is used for requesting the associated user of the interactive video to input a new interactive video according to the interactive video posted by the user so as to interact with the user through videos.

Optionally, before sending the interactive invitation to the associated user of the interactive video, the method may further include determining that a user specified by the posting user is the associated user; or determining an interested user according to a topic to which the interactive video belongs, and historical video posting behaviors of users other than the posting user, and taking the interested user as the associated user.

Optionally, the posting user may pre-specify at least one user. For example, the user may specify a friend, another user in whom the user is interested, or another user with whom the user interacts more to serve as the associated user of the interactive video. It is determined that the user specified by the posting user is the associated user. Accordingly, the posting user can specifically request the specified user to interact with the posting user through videos.

Optionally, the step in which the interested user is determined according to the topic to which the interactive video belongs, and the historical video posting behaviors of the other users and is taken as the associated user includes that a topic interested by the other users according to the historical video posting behaviors of the other users is determined. The acquisition of the interested topic includes that a target user of the topic to which the interactive video belongs is taken as the associated user. Accordingly, the user interested in the topic to which the interactive video belongs can be requested to interact with the posting user through videos.

According to the technical solutions of embodiments of the present disclosure, an interactive invitation is sent to an associated user of an interactive video according to the interactive video already input and posted by a user so as to request the associated user to input a new interactive video so that users are guided through an interactive invitation to interact with each other through interactive videos.

Figure 4:
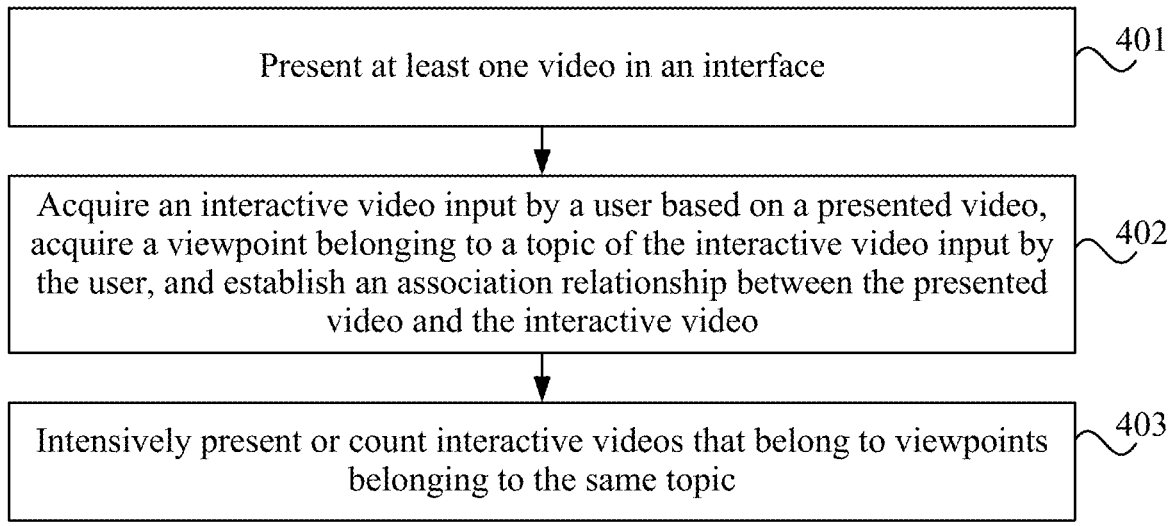
FIG. 4 is a flowchart of a video-based interaction implementation method according to an embodiment of the present disclosure.

FIG. 4 is a flowchart of a video-based interaction implementation method according to an embodiment of the present disclosure. This embodiment may be combined with multiple optional solutions in the preceding one or more embodiments. In this embodiment, when acquiring an interactive video input by a user based on a presented video, the method further includes that a viewpoint belonging to a topic of the interactive video input by the user is acquired.

after acquiring the viewpoint belonging to the topic of the interactive video input by the user, the method further includes the step below.

Interactive videos that belong to viewpoints belonging to the same topic are intensively presented or counted.

As shown in FIG. 4, the method includes the steps below.

In step 401, at least one video is presented in an interface.

In step 402, an interactive video input by a user based on a presented video is acquired, a viewpoint belonging to a topic of the interactive video input by the user is acquired, and an association relationship is established between the presented video and the interactive video.

Optionally, the step in which the viewpoint belonging to the topic of the interactive video input by the user is acquired may include that viewpoint channels are provided in a presentation interface of the presented video and that the viewpoint belonging to the topic is determined according to a viewpoint channel selected in the case where the user inputs the interactive video.

The viewpoint channels are provided in the presentation interface of the presented video. The presentation interface of the presented video may be a video playing interface of the presented video. The topic to which the presented video belongs includes at least two viewpoints. Each viewpoint has a corresponding viewpoint channel.

The viewpoint channel may be a viewpoint channel control. The viewpoint channel control is used for inputting a viewpoint discussion instruction. The viewpoint discussion instruction is an instruction used for entering a shooting preview interface corresponding to the presented video so as to perform video shooting. The user performs a triggering operation on a viewpoint channel control corresponding to one viewpoint to input the viewpoint discussion instruction corresponding to the viewpoint so as to directly enter the shooting preview interface corresponding to the presented video and perform video shooting.

The shooting preview interface may be provided with a shooting control. Optionally, the shooting control may be designed as a shooting icon. When the user presses the shooting icon, video shooting starts. When the user no longer presses the shooting icon, video shooting stops. In the process of shooting a video, the user can make a discussion about the viewpoint the user selected.

The shot video is the interactive video input by the user based on the presented video. The viewpoint corresponding to the viewpoint channel control selected and triggered by the user is the viewpoint belonging to the topic of the interactive video input by the user. Accordingly, the viewpoint belonging to the topic of the interactive video input by the user is acquired according to the triggering operation performed by the user on the viewpoint channel control.

Optionally, the step in which the viewpoint belonging to the topic of the interactive video input by the user is acquired may include that the viewpoint belonging to the topic and configured for the interactive video by the user is acquired.

The topic to which the presented video belongs includes at least two viewpoints. The user selects one viewpoint from the at least two viewpoints included in the topic to which the presented video belongs and configures the viewpoint to be the viewpoint belonging to the topic of the interactive video.

In one example, a viewpoint discussion control is provided in the presentation interface of the presented video. The presentation interface of the presented video may be a video playing interface of the presented video. The viewpoint discussion control is used for inputting a viewpoint discussion instruction. The viewpoint discussion instruction is an instruction used for entering a shooting preview interface corresponding to the presented video so as to perform video shooting. The user performs a triggering operation on the viewpoint discussion control to input the viewpoint discussion instruction corresponding to the viewpoint so as to directly enter the shooting preview interface corresponding to the presented video and perform video shooting.

The shot video is the interactive video input by the user based on the presented video. After it is determined that the shooting of the interactive video is completed, a viewpoint configuration interface corresponding to the interactive video is entered.

The viewpoint configuration interface may include an option control corresponding to at least one viewpoint included in the topic to which the presented video belongs. The user clicks an option control corresponding to one viewpoint to configure the viewpoint as the viewpoint belonging to the topic of the interactive video.

The viewpoint configuration interface may further include a viewpoint input region. The user inputs a customized topic in the viewpoint input region and configures the customized topic as the viewpoint belonging to the topic of the interactive video. The customized topic is a topic viewpoint customized by the user. Accordingly, when the user does not agree with any one of the at least one viewpoint included in the topic of the presented video, the user defines a customized viewpoint of the topic to which the presented video belongs and configures the customized viewpoint as the viewpoint belonging to the topic of the interactive video.

In step 403, interactive videos that belong to viewpoints belonging to the same topic are intensively presented or counted.

In one example, the topic to which the presented video belongs includes two viewpoints, that is, a first viewpoint and a second viewpoint. An interactive video belonging to the first viewpoint is acquired and is presented as a list item on the left of the topic list interface of the topic to which the presented video belongs. An interactive video belonging to the second viewpoint is acquired and is presented as a list item on the right of the topic list interface of the topic to which the presented video belongs.

Accordingly, interactive videos belonging to the first viewpoint are intensively presented on the left of the topic list interface, and interactive videos belonging to the second viewpoint are intensively presented on the right of the topic list interface. The user can clearly distinguish interactive videos belonging to different viewpoints.

In another example, the topic to which the presented video belongs includes three viewpoints, that is, a first viewpoint, a second viewpoint, and a third viewpoint. The number of interactive videos belonging to the first viewpoint, the number of interactive videos belonging to the second viewpoint, and the number of interactive videos belonging to the third viewpoint are counted separately.

Optionally, the number of the interactive videos belonging to the first viewpoint, the number of the interactive videos belonging to the second viewpoint, and the number of the interactive videos belonging to the third viewpoint are presented at set positions in the topic list interface. A higher number of videos indicates that the corresponding viewpoint is supported by more users. Accordingly, a user browsing the topic list interface can clearly determine the number of users supporting each viewpoint.

According to the technical solutions of embodiments of the present disclosure, a viewpoint belonging to a topic of an interactive video input by a user is acquired, and then interactive videos that belong to viewpoints belonging to the same topic are intensively presented or counted. Interactive videos belonging to at least one viewpoint are presented intensively so that the user can clearly distinguish interactive videos belonging to different viewpoints. Moreover, the interactive videos belonging to different viewpoints are counted so that the number of users supporting at least one viewpoint can be determined according to a counting result.

Figure 5A:
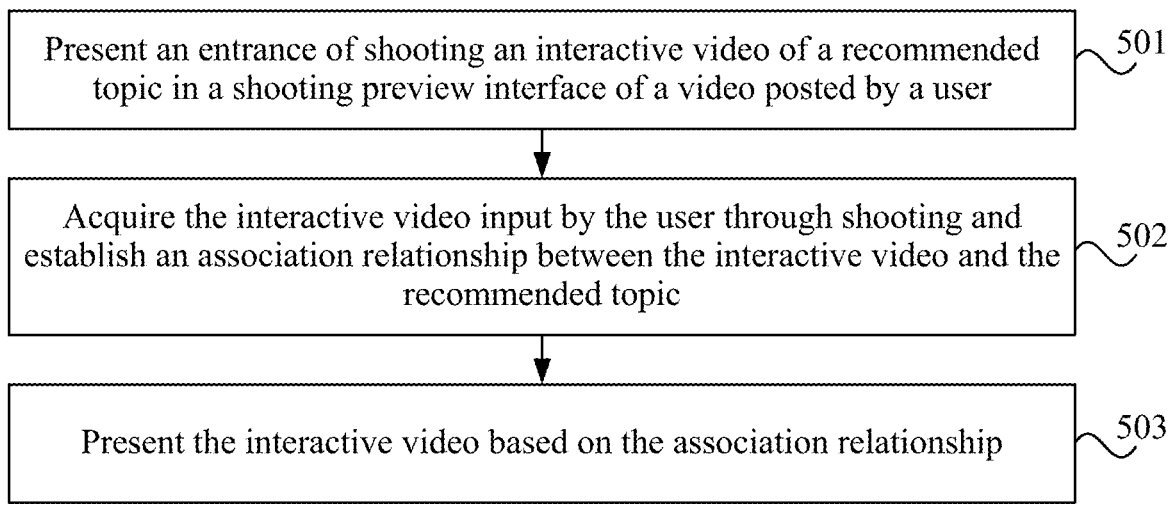
FIG. 5A is a flowchart of a video-based interaction implementation method according to an embodiment of the present disclosure.

FIG. 5A is a flowchart of a video-based interaction implementation method according to an embodiment of the present disclosure. This embodiment may be combined with multiple optional solutions in the preceding one or more embodiments. In this embodiment, the method may further include that an entrance of shooting an interactive video of a recommended topic is presented in a shooting preview interface of a video posted by a user.

After presenting the entrance of shooting the interactive video of the recommended topic, the method may further include that the interactive video input by the user through shooting is acquired and that an association relationship between the interactive video and the recommended topic is established.

As shown in FIG. 5A, the method includes the steps below.

In step 501, an entrance of shooting an interactive video of a recommended topic is presented in a shooting preview interface of a video posted by a user.

Figure 5B:
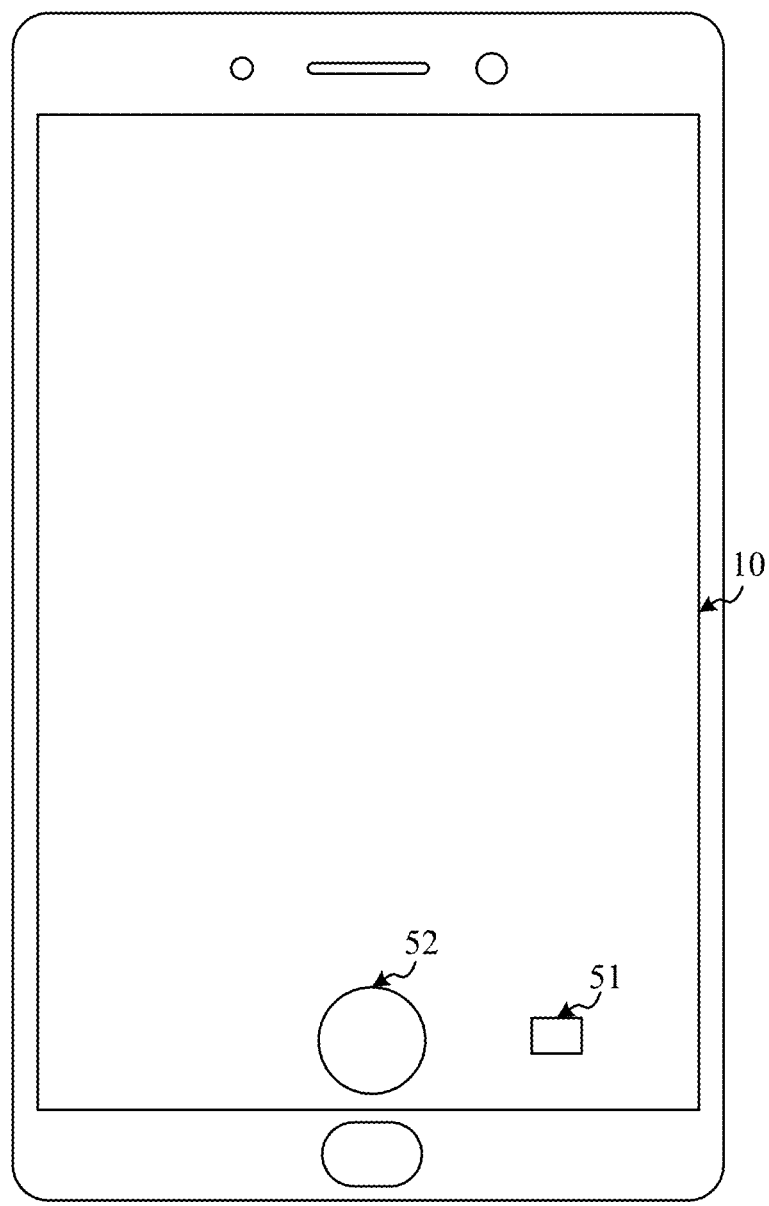
FIG. 5B is a diagram of a shooting preview interface according to an embodiment of the present disclosure.

In one example, a plurality of topics are sequenced in an order of the numbers of interactive videos of the topics from high to low so as to obtain a topic sequencing result. A topic at a first position in the topic sequencing result is acquired to serve as a recommended topic matching the user. An entrance icon 51 of shooting an interactive video of the recommended topic is presented in a shooting preview interface 10, as shown in FIG. 5B, of the video posted by the user. The shooting preview interface 10 provides a shooting icon 52. The user performs a triggering operation on the entrance icon 51 of shooting an interactive video of a recommended topic to input an instruction of shooting the interactive video of the recommended topic so as to directly enter the shooting preview interface corresponding to the recommended topic and perform video shooting.

Figure 5C:
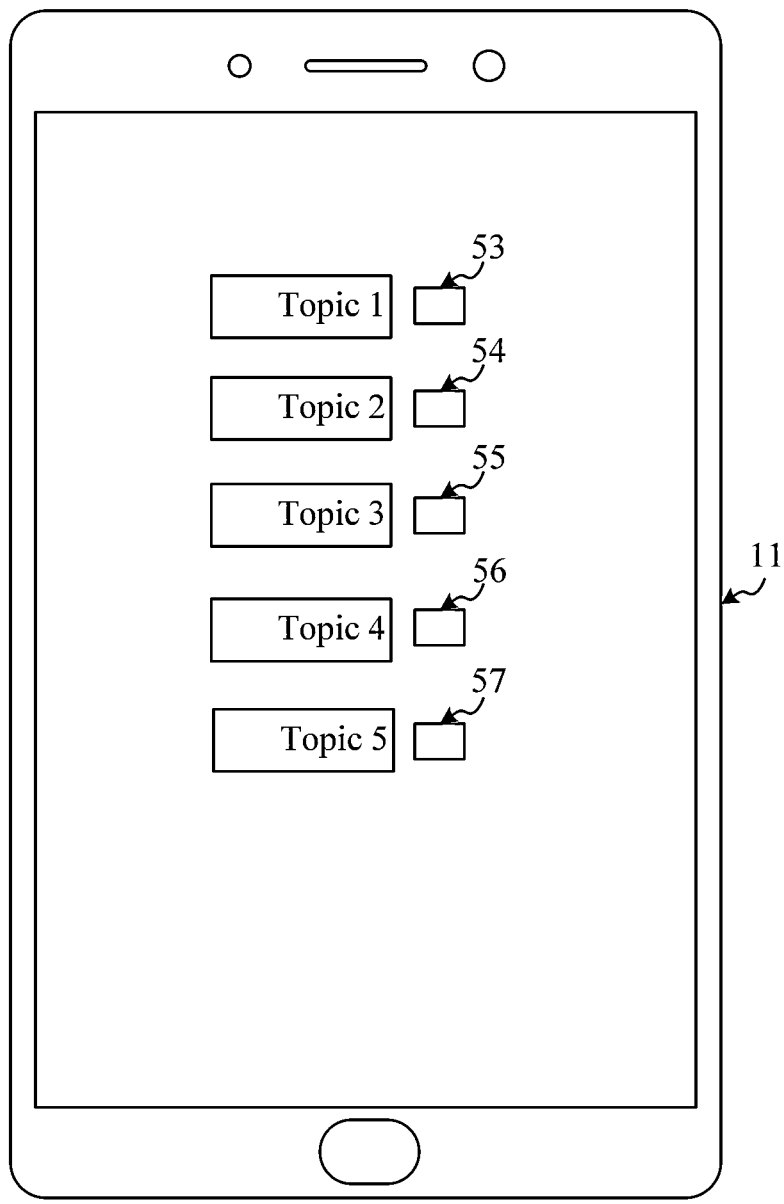
FIG. 5C is a diagram of a shooting entrance list interface according to an embodiment of the present disclosure.

In another example, a plurality of topics are sequenced in an order of the numbers of interactive videos of the topics from high to low so as to obtain a topic sequencing result. Five topics at first five positions in the topic sequencing result are acquired to serve as recommended topics matching the user. The entrance icon 51 of shooting an interactive video of a recommended topic is presented in the shooting preview interface 10, as shown in FIG. 5B, of the video posted by the user. The user performs a triggering operation on the entrance icon 51 of shooting an interactive video of a recommended topic to input an instruction of shooting an interactive video of a recommended topic so as to directly enter a shooting entrance list interface 11, as shown in FIG. 5C, corresponding to the recommended topics. The shooting entrance list interface 11 provides shooting entrance icons corresponding to the five topics, that is, shooting entrance icon 53, shooting entrance icon 54, shooting entrance icon 55, shooting entrance icon 56, and shooting entrance icon 57. The user performs a triggering operation on a shooting entrance icon corresponding to one topic to input an instruction of shooting an interactive video of a recommended topic regarding the topic so as to directly enter the shooting preview interface corresponding to the topic and perform video shooting.

In step 502, the interactive video input by the user through shooting is acquired, and an association relationship between the interactive video and the recommended topic is established.

After it is determined that the user completes video shooting, the interactive video input by the user through shooting is acquired and the recommended topic is set to be a topic to which the shot video belongs. Accordingly, the association relationship between the interactive video and the recommended topic is established.

In step 503, the interactive video is presented based on the association relationship.

Optionally, the interactive video input by the user based on the recommended topic is posted in the topic list interface of the recommended topic according to the association relationship between the interactive video and the recommended topic.

According to the technical solutions of embodiments of the present disclosure, an entrance of shooting an interactive video of a recommended topic is presented in a shooting preview interface of a video posted by a user, then the interactive video input by the user through shooting is acquired, and an association relationship between the interactive video and the recommended topic is established. Accordingly, after the user enters the shooting preview interface for posting the video, the entrance of shooting the interactive video of the recommended topic leads the user to shoot an interactive video regarding the recommended topic and present his viewpoint regarding the recommended topic.

Figure 6:
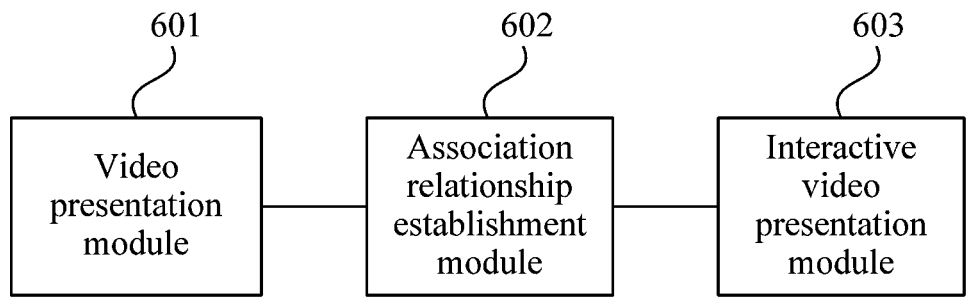
FIG. 6 is a diagram illustrating the structure of a video-based interaction implementation apparatus according to an embodiment of the present disclosure.

FIG. 6 is a diagram illustrating the structure of a video-based interaction implementation apparatus according to an embodiment of the present disclosure. Embodiments of the present disclosure may be applied to the case of video-based interaction. The method is performed by a video-based interaction implementation apparatus. The apparatus may be implemented by software and/or hardware and may be integrated into an electronic device. As shown in FIG. 6, the apparatus may include a video presentation module 601, an association relationship establishment module 602, and an interactive video presentation module 603.

The video presentation module 601 is configured to present at least one video in an interface. The association relationship establishment module 602 is configured to acquire an interactive video input by a user based on a presented video and establish an association relationship between the presented video and the interactive video. The interactive video presentation module 603 is configured to present the interactive video based on the association relationship.

According to the technical solutions of embodiments of the present disclosure, at least one video is presented in an interface; an interactive video input by a user based on a presented video is acquired, and an association relationship is established between the presented video and the interactive video; and the interactive video is presented based on the association relationship. The information that the user posting the interactive video wants to express can be transmitted to other users through the interactive video. The establishment of the association relationship between the presented video and the interactive video can implement the information interaction between a user posting the presented video and the user posting the interactive video, thereby implementing video-based information interaction, enriching the functions of a video, and making the information interaction mode more flexible.

Optionally, on the basis of the preceding technical solutions, the video presentation module 601 may include a list presentation unit configured to present a plurality of videos associated with a current topic in list items in a topic list interface.

Optionally, on the basis of the preceding technical solutions, the association relationship establishment module 602 may include a first entrance provision unit and a first triggering unit. The first entrance provision unit is configured to provide a topic discussion entrance in the topic list interface. The first triggering unit is configured to, in the case where the triggering of the topic discussion entrance by the user is detected, acquire the interactive video input by the user based on a video presented in the topic list interface and establish an association relationship between the current topic and the interactive video.

Optionally, on the basis of the preceding technical solutions, the association relationship establishment module 602 may include a second entrance provision unit, a second triggering unit, and a third triggering unit. The second entrance provision unit is configured to provide a topic discussion entrance or a reply entrance in a video playing interface of the presented video. The second triggering unit is configured to, in the case where the triggering of the topic discussion entrance by the user is detected, acquire the interactive video input by the user based on the presented video and establish an association relationship between the interactive video and a topic to which the presented video belongs. The third triggering unit is configured to, in the case where the triggering of the reply entrance by the user is detected, acquire the interactive video input by the user based on the presented video and establish the association relationship between the presented video and the interactive video.

Optionally, on the basis of the preceding technical solutions, the interactive video presentation module 603 may include a list item presentation unit configured to acquire a plurality of videos among which the association relationship is already established, and present the videos in list items in a topic list interface of a topic to which the videos belong.

Optionally, on the basis of the preceding technical solutions, the interactive video presentation module 603 may include a video playing unit configured to play the interactive video in the video playing interface and provide a topic list interface entrance or an associated video entrance in the video playing interface. A topic list interface is a list interface of a topic to which the at least one video associated with the interactive video belongs. An associated video is one of the at least one video associated with the interactive video.

Optionally, on the basis of the preceding technical solutions, the video-based interaction implementation apparatus may further include an interactive invitation sending module configured to send an interactive invitation to an associated user of the interactive video according to the interactive video already input and posted by the user so as to request the associated user to input a new interactive video.

Optionally, on the basis of the preceding technical solutions, the video-based interaction implementation apparatus may further include a first user determination module or a second user determination module. The first user determination module is configured to determine that a user specified by the posting user is the associated user. The second user determination module is configured to determine an interested user according to a topic to which the interactive video belongs, and historical video posting behaviors of users other than the posting user and take the interested user as the associated user.

Optionally, on the basis of the preceding technical solutions, the video-based interaction implementation apparatus may further include a topic creation module configured to acquire a topic creation request of the user and create a topic according to the topic creation request.

Optionally, on the basis of the preceding technical solutions, the topic is created by performing topic clustering according to a plurality of videos historically posted by a plurality of users.

Optionally, on the basis of the preceding technical solutions, the video-based interaction implementation apparatus may further include a topic text presentation module configured to, in the case where a video is played in the video playing interface, present the topic text of a topic to which the played video belongs.

Optionally, on the basis of the preceding technical solutions, the video-based interaction implementation apparatus may further include a viewpoint acquisition module configured to acquire a viewpoint belonging to the topic of the interactive video input by the user.

Optionally, on the basis of the preceding technical solutions, the viewpoint acquisition module may include a viewpoint selection unit or a viewpoint configuration unit. The viewpoint selection unit is configured to provide viewpoint channels in a presentation interface of the presented video and determine the viewpoint belonging to the topic according to a viewpoint channel selected in the case where the user inputs the interactive video. The viewpoint configuration unit is configured to acquire the viewpoint belonging to the topic and configured for the interactive video by the user.

Optionally, on the basis of the preceding technical solutions, the video-based interaction implementation apparatus may further include a video intensively-processing module configured to intensively present or count interactive videos that belong to viewpoints belonging to the same topic.

Optionally, on the basis of the preceding technical solutions, the video-based interaction implementation apparatus may further include an entrance presentation module configured to present an entrance of browsing an interactive video of a recommended topic and/or a shooting entrance of shooting an interactive video of the recommended topic in a shooting preview interface of the video posted by the user.

Optionally, on the basis of the preceding technical solutions, the video-based interaction implementation apparatus may further include a recommended topic association module configured to acquire the interactive video input by the user through shooting and establish an association relationship between the interactive video and the recommended topic.

The video-based interaction implementation apparatus provided in embodiments of the present disclosure can execute the video-based interaction implementation method provided in embodiments of the present disclosure and has functional modules and effects corresponding to the execution method.

Figure 7:
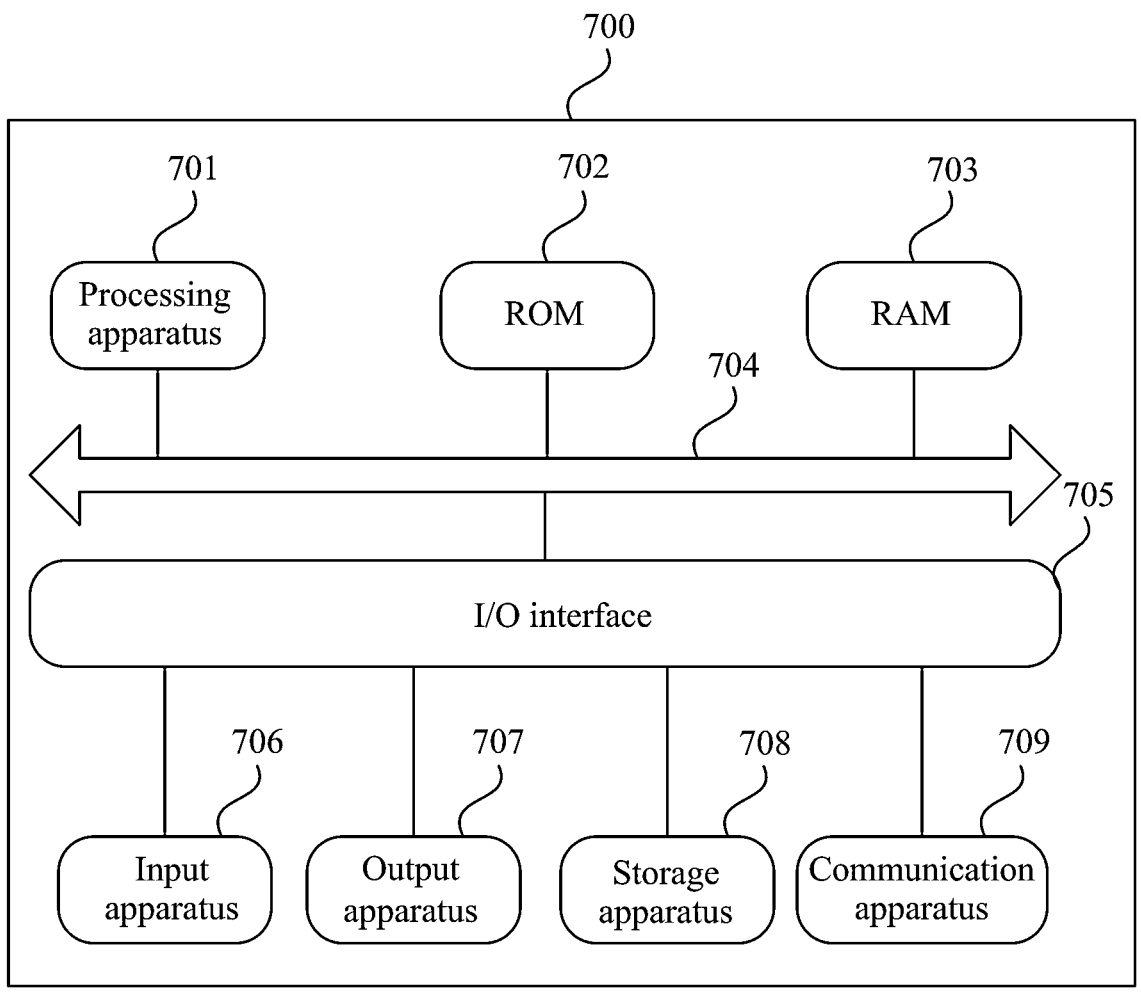
FIG. 7 is a diagram illustrating the structure of an electronic device according to an embodiment of the present disclosure.

Referring to FIG. 7, FIG. 7 shows a diagram illustrating the structure of an electronic device 700 suitable for implementing embodiments of the present disclosure. The electronic device in embodiments of the present disclosure may include a mobile phone, a laptop, a digital broadcast receiver, a personal digital assistant (PDA), a portable Android device (PAD), a personal multimedia player (PMP), and a car carrying terminal (for example, a car carrying navigation terminal). The electronic device shown in FIG. 7 is only an example.

As shown in FIG. 7, the electronic device 700 may include a processing apparatus 701 (such as a central processing unit or a graphics processor). The processing apparatus 701 may perform various appropriate actions and processing according to a program stored in a read-only memory (ROM) 702 or a program loaded into a random access memory (RAM) 703 from a storage apparatus 708. The RAM 703 also stores various programs and data required for the operation of the electronic device 700. The processing apparatus 701, the ROM 702, and the RAM 703 are connected to each other through a bus 704. An input/output (I/O) interface 705 is also connected to the bus 704.

The apparatus below may be connected to the I/O interface 705, including an input apparatus 706 such as a touch screen, a touch pad, a keyboard, a mouse, a camera, a microphone, an accelerometer and a gyroscope, an output apparatus 707 such as a Liquid Crystal Display (LCD), a speaker and a vibrator, storage apparatuses 708 such as a magnetic tape and a hard disk, and a communication apparatus 709. The communication apparatus 709 may allow the electronic device 700 to perform wireless or wired communication with other devices to exchange data. FIG. 7 shows the electronic device 700 having various apparatuses, but it is not necessary to implement or be equipped with all the shown apparatuses. More or fewer apparatuses may be implemented instead.

According to embodiments of the present disclosure, the process described above with reference to the flowchart may be implemented as a computer software program. For example, the embodiments of the present disclosure include a computer program product. The computer program product includes a computer program carried in a non-transitory computer-readable medium. The computer program includes program codes for executing the method shown in the flowchart. In such an embodiment, the computer program may be downloaded and installed from the network through the communication apparatus 709, or may be installed from the storage apparatus 708, or may be installed from the ROM 702. When the computer program is executed by the processing apparatus 701, the preceding functions defined in the methods of embodiments of the present disclosure are executed.

The computer-readable medium described above in the present disclosure may be a computer-readable signal medium or a computer-readable storage medium or any combination thereof. The computer-readable storage medium may be an electronic, magnetic, optical, electromagnetic, infrared or semiconductor system, apparatus or device, or any combination thereof. The computer-readable storage medium may include an electrical connection having one or more wires, a portable computer magnetic disk, a hard disk, an RAM, an ROM, an erasable programmable (EPROM) or a flash memory, an optical fiber, a portable compact disc read-only memory (CD-ROM), an optical storage device, a magnetic storage device, or any suitable combination thereof. In the present disclosure, the computer-readable storage medium may be any tangible medium including or storing a program. The program may be used by or used in conjunction with an instruction execution system, apparatus, or device. In the present disclosure, the computer-readable signal medium may include a data signal propagated on a baseband or as a part of a carrier, and computer-readable program codes are carried in the data signal. This propagated data signal may take a plurality of forms including an electromagnetic signal, an optical signal, or any suitable combination thereof. The computer-readable signal medium may further be any computer-readable medium other than the computer-readable storage medium. The computer-readable signal medium may send, propagate, or transmit a program used by or in conjunction with an instruction execution system, apparatus, or device. The program codes included in the computer-readable medium may be transmitted in any suitable medium, including a wire, an optical cable, a Radio Frequency (RF), or any suitable combination thereof.

In some embodiments, clients and servers may communicate using any currently known or future developed network protocol, such as the Hypertext Transfer Protocol (HTTP), and may be interconnected with any form or medium of digital data communication (for example, a communication network). Examples of the communication network include a local area network (LAN), a wide area network (WAN), an Internet (for example, the Internet), a peer-to-peer network (for example, an Ad-Hoc network), and any network currently known or to be developed in the future.

The computer-readable medium may be included in the electronic device or may exist alone without being assembled into the electronic device.

The computer-readable medium carries one or more programs, where the one or more programs, when executed by the electronic device, cause the electronic device to present at least one video in an interface, to acquire an interactive video input by a user based on a presented video and establish an association relationship between the presented video and the interactive video, and to present the interactive video based on the association relationship.

Computer program codes for performing the operations in the present disclosure may be written in one or more programming languages or a combination thereof. The preceding one or more programming languages include object-oriented programming languages such as Java, Smalltalk and C++, as well as conventional procedural programming languages such as "C" or similar programming languages. The program codes may be executed entirely on a user computer, partly on the user computer, as a stand-alone software package, partly on the user computer and partly on a remote computer, or entirely on the remote computer or a server. In the scenario involving the remote computer, the remote computer may be connected to the user computer through any type of network, including a LAN or a WAN, or the connection may be made to an external computer (for example, through the Internet using an Internet service provider).

The flowcharts and block diagrams in the drawings show possible architectures, functions and operations of the method, apparatus, electronic device and computer program product according to multiple embodiments of the present disclosure. In this regard, each block in the flowcharts or block diagrams may represent a module, a program segment, or part of codes that contains one or more executable instructions for implementing specified logical functions. In some alternative implementations, the functions marked in the blocks may occur in an order different from that marked in the drawings. For example, two successive blocks may, in fact, be executed substantially in parallel or in a reverse order, which depends on the functions involved. Each block of the block diagrams and/or flowcharts, and combinations of blocks in the block diagrams and/or flowcharts may be implemented by a dedicated hardware-based system that performs a specified function or operation, or be implemented by a combination of dedicated hardware and computer instructions.

The modules and units involved in embodiments of the present disclosure may be implemented by software or hardware. For example, the interactive invitation sending module may also be described as "a module that sends an interactive invitation to an associated user of the interactive video according to the interactive video already input and posted by the user so as to request the associated user to input a new interactive video". The list item presentation unit may also be described as "a unit that acquires a plurality of videos among which the association relationship is already established, and presents the videos in list items in a topic list interface of a topic to which the videos belong".

The functions described above herein may be executed, at least partially, by one or more hardware logic components. For example, exemplary types of hardware logic components that may be used include a field programmable gate array (FPGA), an application specific integrated circuit (ASIC), application specific standard parts (ASSP), a System-on-a-Chip (SOC), a complex programmable logic device (CPLD) and the like.

According to one or more embodiments of the present disclosure, a video-based interaction implementation method is provided in example one. The method includes the steps below.

At least one video is presented in an interface.

An interactive video input by a user based on a presented video is acquired, and an association relationship is established between the presented video and the interactive video.

The interactive video is presented based on the association relationship.

According to one or more embodiments of the present disclosure, a video-based interaction implementation method is provided in example two. On the basis of the video-based interaction implementation method in example one, the step in which the at least one video is presented in the interface includes the step below.

A plurality of videos associated with a current topic are presented in list items in a topic list interface.

According to one or more embodiments of the present disclosure, a video-based interaction implementation method is provided in example three. On the basis of the video-based interaction implementation method in example two, the step in which the interactive video input by the user based on the presented video is acquired and in which the association relationship is established between the presented video and the interactive video includes the steps below.

A topic discussion entrance is provided in the topic list interface.

In the case where the triggering of the topic discussion entrance by the user is detected, the interactive video input by the user based on a video presented in the topic list interface is acquired, and an association relationship between the current topic and the interactive video is established.

According to one or more embodiments of the present disclosure, a video-based interaction implementation method is provided in example four. On the basis of the video-based interaction implementation method in example one, the step in which the interactive video input by the user based on the presented video is acquired and in which the association relationship is established between the presented video and the interactive video includes the steps below.

A topic discussion entrance or a reply entrance is provided in a video playing interface of the presented video.

In the case where the triggering of the topic discussion entrance by the user is detected, the interactive video input by the user based on the presented video is acquired, and an association relationship between the interactive video and a topic to which the presented video belongs is established.

In the case where the triggering of the reply entrance by the user is detected, the interactive video input by the user based on the presented video is acquired, and the association relationship between the presented video and the interactive video is established.

According to one or more embodiments of the present disclosure, a video-based interaction implementation method is provided in example five. On the basis of the video-based interaction implementation method in any one of examples one to four, the step in which the interactive video is presented based on the association relationship includes the step below.

A plurality of videos, among which the association relationship is already established, are acquired, and the videos are presented in list items in a topic list interface of a topic to which the videos belong.

According to one or more embodiments of the present disclosure, a video-based interaction implementation method is provided in example six. On the basis of the video-based interaction implementation method in any one of examples one to four, the step in which the interactive video is presented based on the association relationship includes the step below.

The interactive video is played in the video playing interface, and a topic list interface entrance or an associated video entrance is provided in the video playing interface. A topic list interface is a list interface of a topic to which the at least one video associated with the interactive video belongs. An associated video is one of the at least one video associated with the interactive video.

According to one or more embodiments of the present disclosure, a video-based interaction implementation method is provided in example seven. On the basis of the video-based interaction implementation method in example one, the method further includes the step below.

An interactive invitation is sent to an associated user of the interactive video according to the interactive video already input and posted by the user so as to request the associated user to input a new interactive video.

According to one or more embodiments of the present disclosure, a video-based interaction implementation method is provided in example eight. On the basis of the video-based interaction implementation method in example seven, before sending the interactive invitation to the associated user of the interactive video, the method further includes the step below.

It is determined that a user specified by the posting user is the associated user.

Alternatively, an interested user is determined according to a topic to which the interactive video belongs, and historical video posting behaviors of users other than the posting user, and the interested user is taken as the associated user.

According to one or more embodiments of the present disclosure, a video-based interaction implementation method is provided in example nine. On the basis of the video-based interaction implementation method in example one or two, the method further includes the step below.

A topic creation request of the user is created, and a topic according to the topic creation request is created.

According to one or more embodiments of the present disclosure, a video-based interaction implementation method is provided in example ten. On the basis of the video-based interaction implementation method in example two, the topic is created by performing topic clustering according to a plurality of videos historically posted by a plurality of users.

According to one or more embodiments of the present disclosure, a video-based interaction implementation method is provided in example eleven. On the basis of the video-based interaction implementation method in example one or two, the method further includes the step below.

In the case where a video is played in the video playing interface, the topic text of a topic to which the played video belongs is presented.

According to one or more embodiments of the present disclosure, a video-based interaction implementation method is provided in example twelve. On the basis of the video-based interaction implementation method in example one or two, when acquiring the interactive video input by the user based on the presented video, the method further includes the step below.

A viewpoint belonging to a topic of the interactive video input by the user is acquired.

According to one or more embodiments of the present disclosure, a video-based interaction implementation method is provided in example thirteen. On the basis of the video-based interaction implementation method in example twelve, the step in which the viewpoint belonging to the topic of the interactive video input by the user is acquired further includes the step below.

Viewpoint channels are provided in a presentation interface of the presented video, and the viewpoint belonging to the topic is determined according to a viewpoint channel selected in the case where the user inputs the interactive video.

Alternatively, the viewpoint belonging to the topic and configured for the interactive video by the user is acquired.

According to one or more embodiments of the present disclosure, a video-based interaction implementation method is provided in example fourteen. On the basis of the video-based interaction implementation method in example twelve, after acquiring the viewpoint belonging to the topic of the interactive video input by the user, the method further includes the step below.

Interactive videos that belong to viewpoints belonging to the same topic are intensively presented or counted.

According to one or more embodiments of the present disclosure, a video-based interaction implementation method is provided in example fifteen. On the basis of the video-based interaction implementation method in example one or two, the method further includes the step below.

An entrance of browsing an interactive video of a recommended topic and/or a shooting entrance of shooting an interactive video of the recommended topic is presented in a shooting preview interface of the video posted by the user.

According to one or more embodiments of the present disclosure, a video-based interaction implementation method is provided in example sixteen. On the basis of the video-based interaction implementation method in example fifteen, after acquiring the entrance of shooting the interactive video of the recommended topic, the method further includes the step below.

The interactive video input by the user through shooting is acquired, and an association relationship between the interactive video and the recommended topic is established.

According to one or more embodiments of the present disclosure, a video-based interaction implementation apparatus is provided in example seventeen. The apparatus includes a video presentation module, an association relationship establishment module, and an interactive video presentation module.

The video present module is configured to present at least one video in an interface.

The association relationship establishment module is configured to acquire an interactive video input by a user based on a presented video and establish an association relationship between the presented video and the interactive video.

The interactive video presentation module is configured to present the interactive video based on the association relationship.

According to one or more embodiments of the present disclosure, an electronic device is provided in example eighteen. The electronic device includes one or more processing apparatuses and a storage apparatus configured to store one or more programs.

The one or more programs, when executed by the one or more processing apparatuses, cause the one or more processing apparatuses to perform the video-based interaction implementation method according to any one of examples one to sixteen.

According to one or more embodiments of the present disclosure, a computer-readable storage medium storing a computer program is provided. When the computer program is executed by a processor, the video-based interaction implementation method according to any one of examples one to sixteen is performed.

What is claimed is:

1. A video-based interaction implementation method, comprising:
   presenting at least one video belonging to a topic in a topic list interface;
   in a case where triggering of a topic discussion entrance in the topic list interface by a user is detected, acquiring an interactive video input by the user based on a presented video among the at least one video and establishing a first association relationship between the presented video and the interactive video, so that the interactive video is associated with the topic;
   presenting the interactive video based on the first association relationship;
   determining an interested user according to the topic to which the interactive video belongs, and historical video posting behaviors of users other than the user who posted the interactive video, and taking the interested user as an associated user; and
   sending an interactive invitation to the associated user of the interactive video according to the interactive video already input and posted by the user so as to request the associated user to input a new interactive video,
   wherein presenting the at least one video belonging to the topic in the topic list interface comprises:
   in the topic list interface, presenting a plurality of videos associated with the topic in list items, wherein the topic is created by performing topic clustering according to a plurality of videos historically posted by a plurality of users;
   wherein, in the case where triggering of the topic discussion entrance in the topic list interface by the user is detected, acquiring the interactive video input by the user based on the presented video and establishing the first association relationship between the presented video and the interactive video comprises:
   providing the topic discussion entrance in the topic list interface; and
   in a case where triggering of the topic discussion entrance by the user is detected, acquiring the interactive video input by the user based on a video presented in the topic list interface and establishing a second association relationship between the topic and the interactive video so that the first association relationship is established between the presented video and the interactive video.

2. The method according to claim 1, wherein presenting the interactive video based on the first association relationship comprises:
   acquiring a plurality of videos among which the first association relationship is already established, and presenting the plurality of videos in list items in the topic list interface.

3. The method according to claim 1, wherein presenting the interactive video based on the first association relationship comprises:
   playing the interactive video in a video playing interface and providing, in the video playing interface, a topic list interface entrance or an associated video entrance.

4. The method according to claim 1, further comprising:
   acquiring a topic creation request of the user and creating a new topic according to the topic creation request.

5. The method according to claim 1, further comprising:
in a case where a video is played in a video playing interface, presenting a topic text of a topic to which the played video belongs.

6. The method according to claim 1, wherein when acquiring the interactive video input by the user based on the presented video, further comprising:
acquiring a viewpoint belonging to the topic of the interactive video input by the user.

7. The method according to claim 6, wherein acquiring the viewpoint belonging to the topic of the interactive video input by the user comprises:
providing viewpoint channels in a presentation interface of the presented video and determining, according to a viewpoint channel among the viewpoint channels and selected in a case where the user inputs the interactive video, the viewpoint belonging to the topic; or
acquiring the viewpoint belonging to the topic and configured for the interactive video by the user.

8. The method according to claim 6, wherein after acquiring the viewpoint belonging to the topic of the interactive video input by the user, further comprising:
presenting or counting interactive videos that belong to viewpoints belonging to a same topic.

9. The method according to claim 1, further comprising:
presenting, in a shooting preview interface of a video posted by the user, at least one of an entrance of browsing an interactive video of a recommended topic or an entrance of shooting an interactive video of the recommended topic.

10. The method according to claim 9, wherein after presenting the entrance of shooting the interactive video of the recommended topic, further comprising:
acquiring the interactive video input by the user through shooting and establishing a third association relationship between the interactive video and the recommended topic.

11. An electronic device, comprising:
one or more processing apparatuses; and
a storage apparatus, which is configured to store one or more programs;
wherein the one or more programs, when executed by the one or more processing apparatuses, cause the one or more processing apparatuses to perform a video-based interaction implementation method, wherein the video-based interaction implementation method comprises:
presenting at least one video belonging to a topic in a topic list interface;
in a case where triggering of a topic discussion entrance in the topic list interface by a user is detected, acquiring an interactive video input by the user based on a presented video among the at least one video and establishing a first association relationship between the presented video and the interactive video so that the interactive video is associated with the topic;
presenting the interactive video based on the first association relationship;
determining an interested user according to the topic to which the interactive video belongs, and historical video posting behaviors of users other than the user who posted the interactive video, and taking the interested user as an associated user; and
sending an interactive invitation to the associated user of the interactive video according to the interactive video already input and posted by the user so as to request the associated user to input a new interactive video,
wherein presenting the at least one video belonging to the topic in the topic list interface comprises:
in the topic list interface, presenting a plurality of videos associated with the topic in list items, wherein the topic is created by performing topic clustering according to a plurality of videos historically posted by a plurality of users;
wherein, in the case where triggering of the topic discussion entrance in the topic list interface by the user is detected, acquiring the interactive video input by the user based on the presented video and establishing the first association relationship between the presented video and the interactive video comprises:
providing the topic discussion entrance in the topic list interface; and
in a case where triggering of the topic discussion entrance by the user is detected, acquiring the interactive video input by the user based on a video presented in the topic list interface and establishing a second association relationship between the topic and the interactive video, so that the first association relationship is established between the presented video and the interactive video.

12. A non-transitory computer-readable storage medium storing a computer program, wherein when the computer program is executed by a processor, a video-based interaction implementation method is implemented, wherein the video-based interaction implementation method comprises:
presenting at least one video belonging to a topic in a topic list interface;
in a case where triggering of a topic discussion entrance in the topic list interface by a user is detected, acquiring an interactive video input by a user based on a presented video among the at least one video and establishing a first association relationship between the presented video and the interactive video, so that the interactive video is associated with the topic;
presenting the interactive video based on the first association relationship;
determining an interested user according to the topic to which the interactive video belongs, and historical video posting behaviors of users other than the user who posted the interactive video, and taking the interested user as an associated user; and
sending an interactive invitation to the associated user of the interactive video according to the interactive video already input and posted by the user so as to request the associated user to input a new interactive video,
wherein presenting the at least one video belonging to the topic in the topic list interface comprises:
in the topic list interface, presenting a plurality of videos associated with the topic in list items, wherein the topic is created by performing topic clustering according to a plurality of videos historically posted by a plurality of users;
wherein, in the case where triggering of the topic discussion entrance in the topic list interface by the user is detected, acquiring the interactive video input by the user based on the presented video and establishing the first association relationship between the presented video and the interactive video comprises:
providing the topic discussion entrance in the topic list interface; and
in a case where triggering of the topic discussion entrance by the user is detected, acquiring the interactive video input by the user based on a video presented in the topic list interface and establishing a second association relationship between the topic and the interactive video so that the first association relationship is established between the presented video and the interactive video.

\* \* \* \* \*